United States Patent
Needham et al.

(10) Patent No.: US 10,095,549 B1
(45) Date of Patent: Oct. 9, 2018

(54) OWNERSHIP TRANSFER ACCOUNT SERVICE IN A VIRTUAL COMPUTING ENVIRONMENT

(71) Applicant: Amazon Technologies, Inc., Seattle, WA (US)

(72) Inventors: Sean Michael Needham, Western Cape (ZA); Attila Narin, Capellen (LU); David Walker, Old Basing (GB)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 14/869,494

(22) Filed: Sep. 29, 2015

(51) Int. Cl.
*H04L 12/911* (2013.01)
*G06F 9/50* (2006.01)
*H04L 29/08* (2006.01)
*H04L 29/06* (2006.01)

(52) U.S. Cl.
CPC ............ *G06F 9/5055* (2013.01); *H04L 47/70* (2013.01); *H04L 63/083* (2013.01); *H04L 63/10* (2013.01); *H04L 67/306* (2013.01)

(58) Field of Classification Search
CPC ........................................................ H04L 63/10
See application file for complete search history.

(56) References Cited

U.S. PATENT DOCUMENTS

| | | | | |
|---|---|---|---|---|
| 8,285,825 B1* | 10/2012 | Nagaraj | ............... | H04L 41/04 709/203 |
| 8,756,322 B1* | 6/2014 | Lynch | ............... | H04L 47/62 709/226 |
| 8,924,532 B2* | 12/2014 | Oppitz | ............. | G06Q 10/06316 709/223 |
| 9,275,408 B1* | 3/2016 | King | ............... | G06F 21/33 |
| 9,411,982 B1* | 8/2016 | Dippenaar | ........... | G06F 21/6245 |
| 9,721,261 B2* | 8/2017 | Wilkes | ............... | G06Q 30/02 |
| 2007/0276715 A1* | 11/2007 | Beringer | ............ | G06Q 10/0633 705/7.27 |
| 2009/0158237 A1* | 6/2009 | Zhang | ............ | G06Q 10/10 717/100 |

(Continued)

OTHER PUBLICATIONS

Chris Blackhurst, Chris Blackhurst: How you can keep vital data safe for when your number's up, http://www.standard.co.uk/business/chris-blackhurst-how-you-can-keep-vital-data-sate-for-when-your-numbers-up-a2953926.html, as accessed Sep. 29, 2015, Sep. 23, 2015, 6 pages, Evening Standard, Kensington, London.

*Primary Examiner* — Lashonda Jacobs
(74) *Attorney, Agent, or Firm* — Thorpe North & Western, LLP.

(57) ABSTRACT

Technology is described for providing an ownership transfer service in virtual computing service environment. Computing resources under the control of one or multiple customers are stored in an ownership transfer account. Workflows based on a pre-defined set of triggers for releasing the computing resources from the ownership transfer account are established. Exclusive control over the computing resources may be transferred from the single or multiple customers to at least one of the multiple customers or to a receiving customer according to a triggering event. The exclusive control over the computing resources from one or at least one of the multiple customers is terminated upon occurrence of one of the pre-defined set of triggers or temporary control is granted based on rules such as time periods.

20 Claims, 15 Drawing Sheets

(56) References Cited

U.S. PATENT DOCUMENTS

| | | | |
|---|---|---|---|
| 2011/0238546 A1* | 9/2011 | Certain | G06Q 10/00 705/34 |
| 2012/0016803 A1* | 1/2012 | Tharp | G06Q 10/10 705/319 |
| 2012/0036462 A1* | 2/2012 | Schwartz | G06Q 10/06 715/771 |
| 2014/0207925 A1* | 7/2014 | Xun | H04L 41/0893 709/223 |
| 2017/0046664 A1* | 2/2017 | Haldenby | G06Q 20/0655 |

* cited by examiner

OWNERSHIP TRANSFER ACCOUNT SERVICE IN A VIRTUAL COMPUTING ENVIRONMENT

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Virtualization technologies may be used to execute computing resources that provide, for example, Infrastructure as a Service ("IaaS"), Platform as a Service ("PaaS"), and/or Software as a Service ("SaaS"). Launching computing resources may involve launching various virtualized computing resource components that may include: one or more computing instances, software services, virtual networks, subnets, virtualized storage, as well as other computing resources. Some computing resource components may launch sequentially, while other computing resource components may launch in parallel. After the computing resource components have launched, a customer may be provided access to the computing resource group to perform computing work.

DETAILED DESCRIPTION

Figure 1:
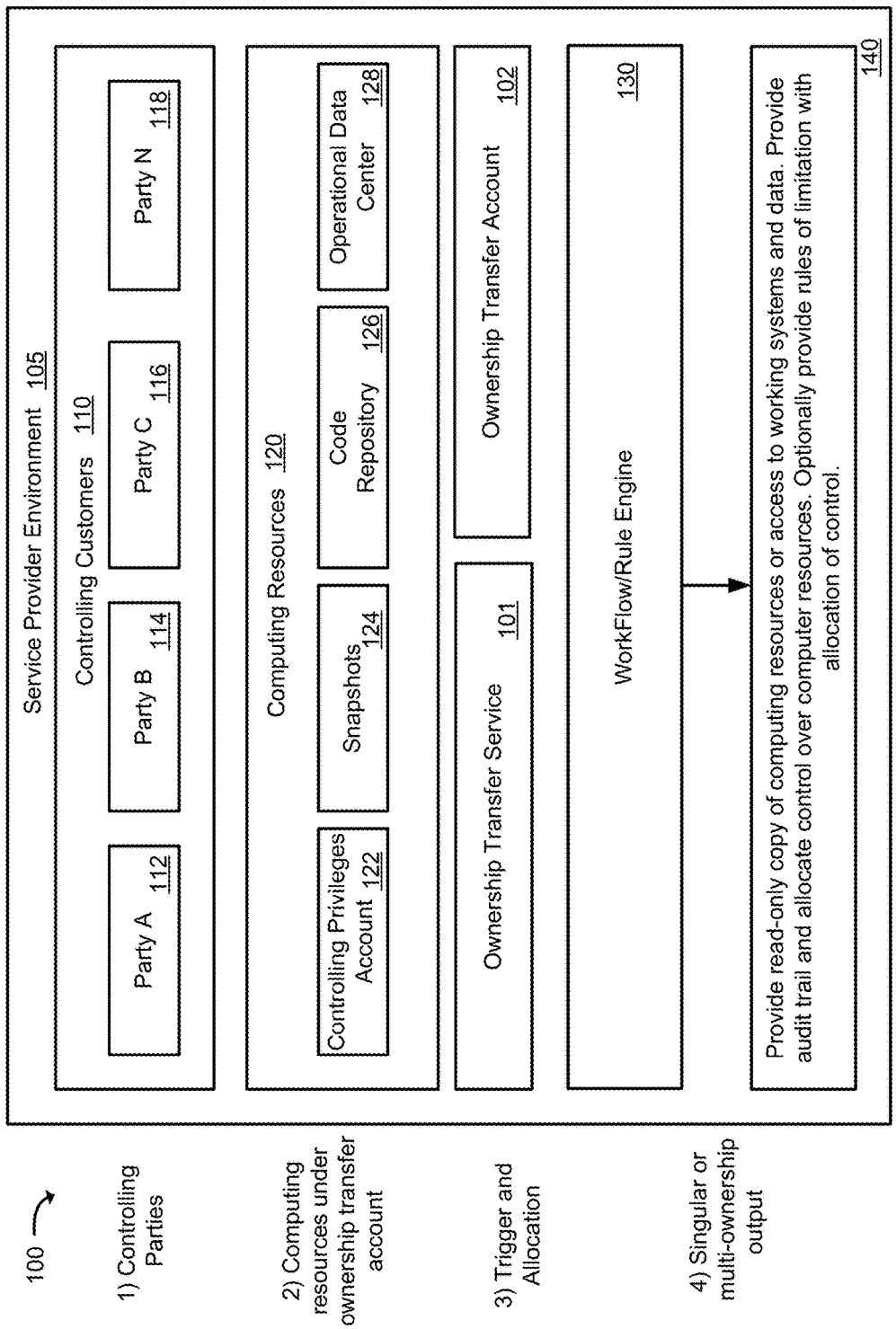
FIG. 1 is a block diagram that illustrates a system for providing an ownership account transfer service for controlling and transferring computing resources in a service provider environment according to an example of the present technology.

A technology is described for providing an ownership account transfer service in virtual computing service environment. Computing resources, such as virtualized computing resources, under the control of multiple customers may be transferred to and stored in an ownership transfer account. Workflows based on a pre-defined set of triggers for releasing the computing resources from the ownership transfer account may be established. Control over the computing resources may be transferred from the multiple customers to at least one of the multiple customers or one or more new customers according to a triggering event. The control over the computing resources from the multiple customers may be terminated upon occurrence of one of the pre-defined set of triggers. Examples of virtual computing resources may be computing instances, block storage, software machine images, load balancers, archive storage, logs, NoSQL (No Structured Query Language) data stores, virtualized data stores, virtualized relational databases, virtualized network appliances (e.g., network address translation (NAT), gateways, firewalls), virtual private clouds, and other virtual computing resources.

In an additional example aspect, technology is described for providing an ownership account transfer service in virtual computing service environment. Computing resources under the control of multiple customers may be transferred to and stored in an ownership transfer account. Exclusive control over the computing resources may be transferred from the multiple customers to at least one of the multiple customers, and/or to one or more receiving customers (e.g., third party customers that currently do not have control over the computing resources) according to defined workflows.

In one aspect, computing resources under the control of one or multiple customers may be stored in an ownership transfer account. Workflows based on a pre-defined set of triggers for releasing the computing resources from the ownership transfer account may be established. Exclusive control over the computing resources may be transferred from the single or multiple customers to at least one of the multiple customers or to a receiving customer according to a triggering event. The exclusive control over the computing resources from one or at least one of the multiple customers may be terminated upon occurrence of one of the pre-defined set of triggers or temporary control may granted based on rules such as time period. For example, a transfer of computing resources and assets may be a "one-to-many" transfer (e.g., a transfer of computing resources and assets from a single customer to multiple customers) and may be a transfer of software as a service (SaaS) to from a single user (such as a SaaS company) to multiple customers who use the computing resources and assets on liquidation of the SaaS company. Each of the multiple customers may receive a read only copy of an operational environment (possibly excluding data) and the single customer from which the computing resources and assets were transferred may be a director or controller (e.g., single user) of the SaaS company.

In one aspect, a workflow may be defined as a series of complete actions in carrying out one or more processes within the service provider environment, and a service may implement and monitor those actions. In one aspect, the workflow may build, run, and scale jobs or tasks in the service provider environment that have parallel or sequential steps. The workflows may be considered as fully-managed state trackers and task coordinators.

The exclusive control over the computing resources owned by at least one customer may be terminated upon occurrence of one of the pre-defined set of triggers. In response to the triggers, the exclusive control over the computing resources may be transferred to one or more of the previous controlling and transferring customers or transferred to a new receiving customer.

In an additional example aspect, technology is described for providing an ownership account transfer service, where controlling privileges accounts (e.g., root customer accounts) of computing resources under the control of multiple customers may be stored in an ownership transfer account. Workflows may be established that can be activated based on a pre-defined set of triggers for releasing the controlling privileges accounts of the computing resources from the ownership transfer account to receiving customer accounts. Permission to transfer exclusive control over the controlling privileges accounts of the computing resources from the multiple customers that control the controlling privileges accounts of computing resources to receiving customer accounts may be granted according to one or more workflows. A controlling privileges account password for accessing the computing resources may be generated and also provided to receiving customer accounts.

In one aspect, following the transfer of the exclusive control over the computing resources to either: one of the multiple customers or at least one receiving customer (e.g., a customer that did not previously have control over the computing resources), the exclusive control over the computing resources by at least one of the multiple controlling and transferring customers may be terminated upon occurrence of one of the pre-defined set of triggers. Access to the computing resources may be terminated upon one or more triggering events from the pre-defined set of triggers which initiate the workflows. In one aspect, the pre-defined set of triggers may be a vote amongst the controlling and transferring customers, an expiration of a predetermined period of time, a financial event (e.g. payment of money through service provider environment or another payment service), loading of legal documents, and/or events outlined or defined within a third party ownership transfer account agreement. The access to the computing resources may also be terminated upon expiration of another predetermined time period.

In one aspect, a multiplicity of stages and workflows are described herein for actions to be performed for transferring ownership of computing resources and customer accounts using an ownership account transfer service in virtual computing service environment. For instance, a request for the transfer of an object (e.g., computing resources and customer accounts) may proceed from the request stage to the approval and action stage via a set of one or more approvers which provide approval for the transfer. The stages that are tested may comprise 1) a single approval stage, 2) a quorum approval stage, 3) an action stage, and/or 4) a wait stage. In one example aspect, each of these stages may be chained together in the manner of sequential operation (e.g., such as by use of one or more logic rules in a computing system) where the output of one stage forms the input of the next, to produce approver-driven workflows. Within each stage, a predetermined number of data recording operations may be performed in order to enhance the evidence collected for the workflow and the passage of an object through it.

In one example, computing resources and assets may be placed in an ownership account transfer account controlled by a single customer and then be sent to multiple recipients. That is, multiple customers may be in control over the received computing resources and assets. However, control over the computing resources and assets may be: 1) transferred from multiple customers to a single customer (e.g., "many-to-one" such as issuing control of a controlling privileges account from many customer to a single customer for a time period), 2) transferred from a single customer to multiple customers (e.g., "one-to-many" such as a customer with single control hands over copy of the customer's software or running software as a service (SaaS) to many customers that signed up upon liquidation of the customer's company"), and/or 3) transferred from multiple customers to multiple customers (e.g., "many-to-many" such as many customers involved in an initial control of the computing resources and assets and handing over a copy of the customer's software or running software as a service (SaaS) to many other customers that signed up upon liquidation of the customer's company).

Moreover, it should be noted that a transfer process, as used herein, may cause virtualized computing resources to be copied, moved or transformed in some manner (e.g., the virtualized computing resources may be made read only and/or have customer data removed) as part of the output workflow. Also, computing resources and assets may include any database, network, network resources, services, ownership transfer account, ownership transfer service, assets, digital assets, files, and/or virtualized computing resources, each of which may be eligible for an ownership transfer account and workflows, which may include computing instances of an ownership transfer service itself. Further, "storage" can include digital assets such as files held on an underlying storage service and also the storage service itself.

FIG. 1 is a block diagram that illustrates a system 100 providing an ownership transfer service for controlling and transferring computing resources in a service provider environment 105 according to an example of the present technology. The system 100 may be a service provider environment 105, and may include one or more controlling customers 110, such as party A 112, Party B 114, Party C 116, and Party N 118. The system 100 may include, computing resources 120, such as, for example, a controlling privileges account 122 (e.g., a root customer account), snapshots 124, a code repository 126, an operational data center 128 and/or other computing resources, such as accounts, data, working applications, computing instances, virtual networking assets, and other virtual or non-virtual assets. The system 100 may also include a workflow/rules engine 130 that may interface with an ownership transfer service 101 and/or be associated with a third ($3^{rd}$) party broker (e.g., a $3^{rd}$ party ownership transfer account broker).

In operation, the system 100 depicts multi-partisan control (e.g., control over the computing resources 120 by the controlling customers 110) of virtualized objects of value, such as the computing resources 120, which may be at rest or not in execution, and may be held in a controlled and limited access state using an ownership transfer account 102 by an ownership account transfer service 101. In other words, Party A 112, Party B 114, Party C 116, and Party N 118 may be customers with initial ownership control over the computing resources 120. Using the workflow/rules engine 130, a triggering event can cause a release and/or allocation of the computing resources 120, as approved by pre-determined customers (e.g., the controlling customers 110), from the ownership account transfer service to a state no longer entirely controlled by ownership transfer account or the controlling customers 110. The conditions upon which computing resources are transferred out of an ownership transfer account may be provided based on certain rule-based decisions and limitations (such as a time based expiry or decision over which customer and/or non-customer shall be the recipient(s) of the computing resources 120). For example, as depicted in block 140, the ownership account transfer service 101 may transfer control over the computing resources and provide a read-only copy of the computing resources 120.

Also, the ownership account transfer service 101 in the service provider environment 105 may provide access to the working and functioning data and computing resources in the service provider environment 105, along with a full audit trail of the ownership transfer service 101. It should be noted that establishment of workflows for the ownership account transfer service 101 may be either unidirectional or bi-directional in the service provider environment 105.

For example, a workflow may include, but is not limited to, restricting the workflow/rules engine 130 to triggering an allocation of a defined output type for the computing resources 120 to single or multiple set of customers (who may not necessarily be the controlling customers 110) using the ownership account transfer service 101 and the ownership transfer account 102. The transfer of control from each of the controlling and transferring customers 120 to just one of the controlling and transferring customers or a receiving customer may be permanent or temporary (e.g., a transfer may have a timed based expiry before reverting back to the controlling customers 110 or "multi-party control" via the ownership account transfer service). These limitations may be set in the rules or the workflow/rules engine 130. For example, the allocation may mean handing over permanent control of the items of value, such as the computing resources 120, and then transferring the items of value back to the originating customer accounts. In addition, for receiving accounts, a new transfer may be submitted to the ownership account transfer service and a new ownership account transfer service construct may then be put in place. In one aspect, the workflow trigger may be a vote using a voting system of controlling and transferring customers for transferring the computing resources or the workflow trigger may be an event identified in a 3rd party ownership account transfer agreement, which may use independent legal review to activate an appropriate trigger in the ownership account transfer agreement.

Figure 2:
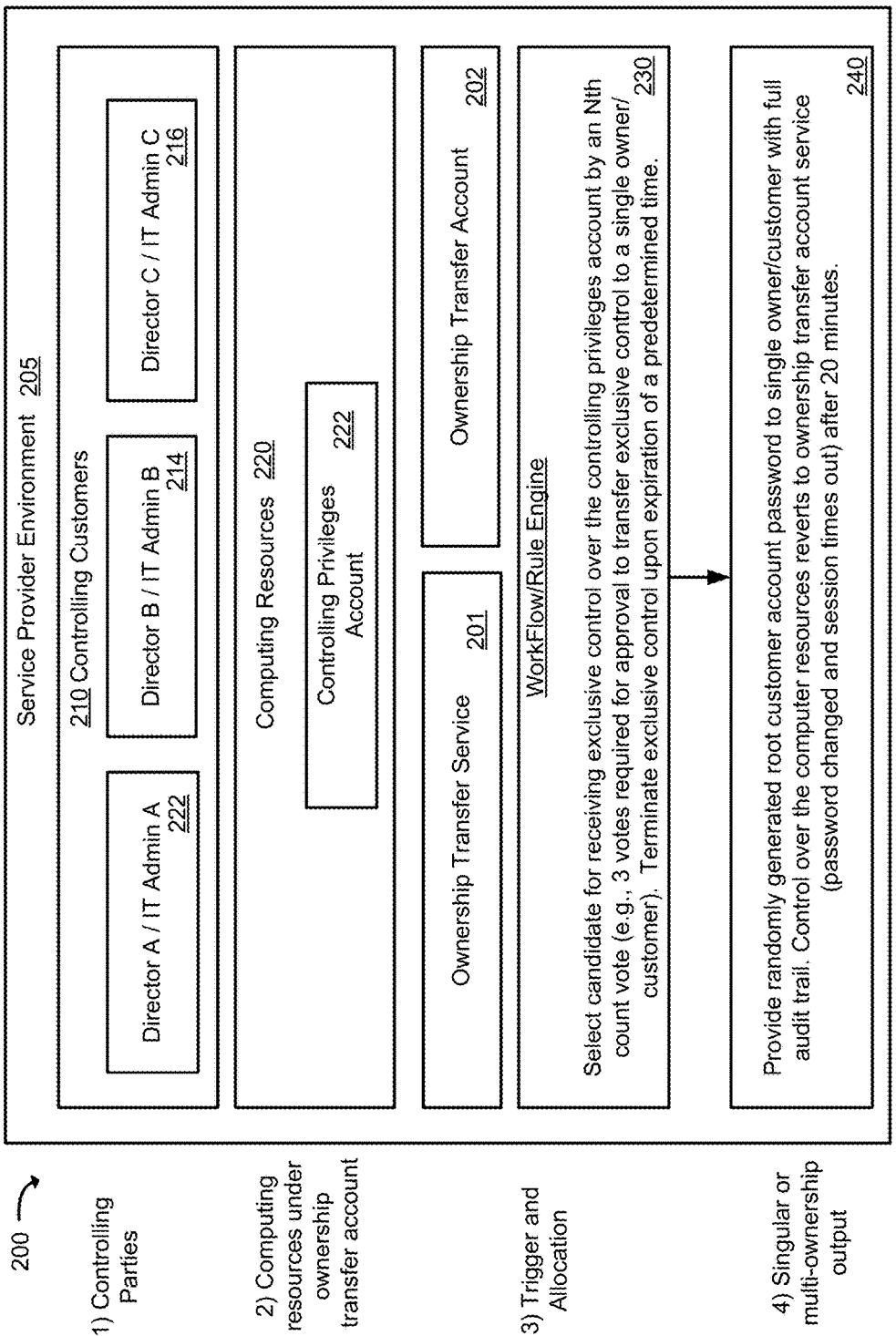
FIG. 2 is a block diagram that illustrates a system for securing a controlling privileges account with an ownership account transfer service for controlling and transferring computing resources in a service provider environment according to an example of the present technology.

FIG. 2 is a block diagram that illustrates a system 200 for securing a controlling privileges account that may be transferred and controlled by an ownership account transfer service in a service provider environment according to an example of the present technology. The description and workflows of FIG. 1 may also apply to and/or be associated with the description and workflows of FIG. 2. The system 200 may be a service provider environment 205, and may include one or more controlling and transferring customers 210, such as for example, multiple directors or Information technology (IT) administrators (Admin), such as Director A/IT Admin A 212, Director B/IT Admin B 214, and Director C/IT Admin C 216. The system 200 may include, computing resources 220, such as, for example, a controlling privileges account 222 (e.g., a root customer account), and/or other computing resources, such as computing instances, virtual networking resources, accounts, data, working applications, storage resources and other virtual or non-virtual assets. The system 200 may also include a workflow/rules engine 230, which may be associated with and used in conjunction with an ownership account transfer service 201. In an alternative configuration, the ownership account transfer service 201 may be associated with a third party broker for brokering and maintaining the ownership account transfer service and an ownership transfer account 202.

In operation, the system 200 depicts multi-partisan control (e.g., control by the controlling and transferring customers 210) of items of value, such as the computing resources 220, which may be at rest or not in execution, which may be held in controlled and limited access using an ownership transfer account 202 by the ownership account transfer service 201. In other words, Director A/IT Admin A 212, Director B/IT Admin B 214, and Director C/IT Admin C 216 may be controlling and transferring customer accounts that have control over the computer resources 220 (e.g., computer resources that may be computing instances, storage resource in storage service, etc.). Using the workflow/rules engine 230, a triggering event can cause a release and/or allocation of the computing resources 220 from pre-determined customers (e.g., the controlling and transferring customers 210) to a state no longer entirely controlled by ownership transfer account 201 or the controlling and transferring customers 210.

For example, the workflow/rules engine 230 may identify a candidate for receiving exclusive control over the controlling privileges account 220 and an N count vote by the controlling and transferring customers 210 may signify approval to transfer exclusive control to a single owner and/or customer, such a one of the controlling and transferring customers 210 or a receiving customer. For example, in one example, three votes may be required by each of the controlling and transferring customers 210. In one example configuration, the workflow/rules engine 230 may terminate the exclusive control over the computing resources 220 by the controlling and transferring customers 210 upon expiration of a predetermined time period. As depicted in block 240, the service provider environment 205 may provide a randomly generated controlling privileges account 220 password to a single customer (e.g., only one of the controlling and transferring customers 210, such as Director B/IT Admin B 214, and/or a receiving customer or non-customer that has no current control over the computing resources 220. Also, the ownership account transfer service 201 in the service provider environment 205 may provide a full audit trail of an ownership transfer service along with the controlling privileges account password. Upon the expiration of a predetermined time, such as, for example, upon the expiration of 20 minutes, the exclusive control may revert back to the ownership account transfer service 20 in the service provider environment 205 with the controlling and transferring customers 210 resuming exclusive control over the computing resources 220.

Figure 3:
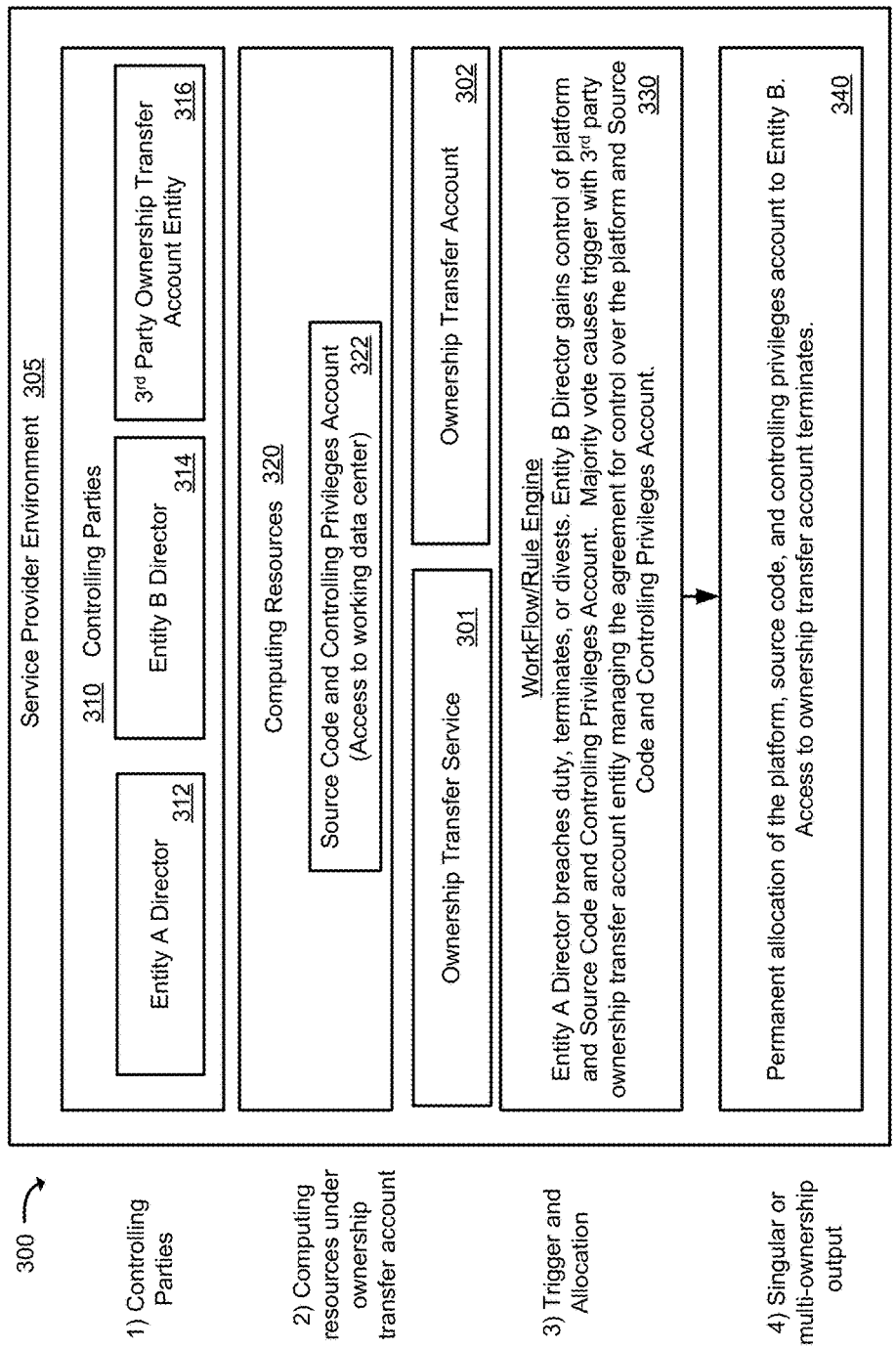
FIG. 3 is a block diagram that illustrates a system for protecting vested $3^{rd}$ party interests using an ownership account transfer service for controlling and transferring computing resources in a service provider environment according to an example of the present technology.

FIG. 3 is a block diagram that illustrates a system 300 for protecting vested $3^{rd}$ party interests and for providing an ownership account transfer service 20 for transferring and controlling and transferring computing resources in a service provider environment according to an example of the present technology. The description and workflows of FIG. 1 and FIG. 2 may also be applied to and/or associated with the description and workflows of FIG. 3. The system 300 may be a service provider environment 305, and may include one or more controlling and transferring customers 310, such as for example, multiple director entities (e.g., Entity A director 312 and Entity B director 314) and a $3^{rd}$ Party Ownership Transfer Account Entity 316. The system 300 may include, computing resources 320, such as, for example, source code and controlling privileges account 322 (which may provide access to a working data center), and/or other computing resources, such as accounts, data, working applications, other virtual or non-virtual assets. The system 300 may also include a workflow/rules engine 330, which may be associated with and used in conjunction with an ownership account transfer service 301. The ownership account transfer service 301 may be associated with a third party broker for brokering and maintaining the ownership account transfer service and an ownership transfer account 302.

In operation, the system 300 depicts multi-partisan control (e.g., control by the controlling and transferring customers 310) of items of value, such as the computing resources 320, which are held in a controlled and limited access state using an ownership transfer account 302 managed by the ownership account transfer service 301. In other words, the controlling and transferring customers 310 may be customers owning the computer resources 320. Using the workflow/rules engine 330, a triggering event can cause a release and/or allocation of the computing resources 320, by pre-determined customers (e.g., the controlling and transferring customers 310) based on the workflow/rules engine 330 with pre-defined set of triggers to release the computing resources from the ownership account transfer service 30 to a state no longer entirely controlled by ownership transfer account or the controlling and transferring customers 310.

For example, the workflow/rules engine 330 may detect that Entity A Director 312 breaches a duty, is terminated, and/or divests ownership in computing resources 320 or a legal entity. Entity B Director 314 may receive control of the computing resources 320, such as the source code and controlling privileges account 322. A vote may be requested by the workflow rules before and/or to initiate an occurrence of the triggering event, such as the breach of duty, termination, and/or divesting. In one aspect, a majority vote may trigger a transfer of the exclusive control over the computing resources 320 to the $3^{rd}$ party ownership transfer account entity 316.

As depicted in block 340, the ownership account transfer service 301 of the service provider environment 305 may transfer permanent allocation over the computing resources 320, such as the source code and the controlling privileges account 322, to Entity B Director 314. Also, the ownership account transfer service 301 in the service provider environment 305 may provide a full audit trail of the transfer by the ownership account transfer service 30 along with the controlling privileges account password. Upon the expiration of a predetermined time, such as, for example, upon the expiration of 20 minutes, the exclusive control may revert back to the ownership account transfer service 30 in the service provider environment 305 with the controlling and transferring customers 310 resuming exclusive control over the computing resources 320. Upon a permanent transfer, access to the computing resources 320 by the $3^{rd}$ party ownership transfer service account entity 316 may be terminated.

Figure 4:
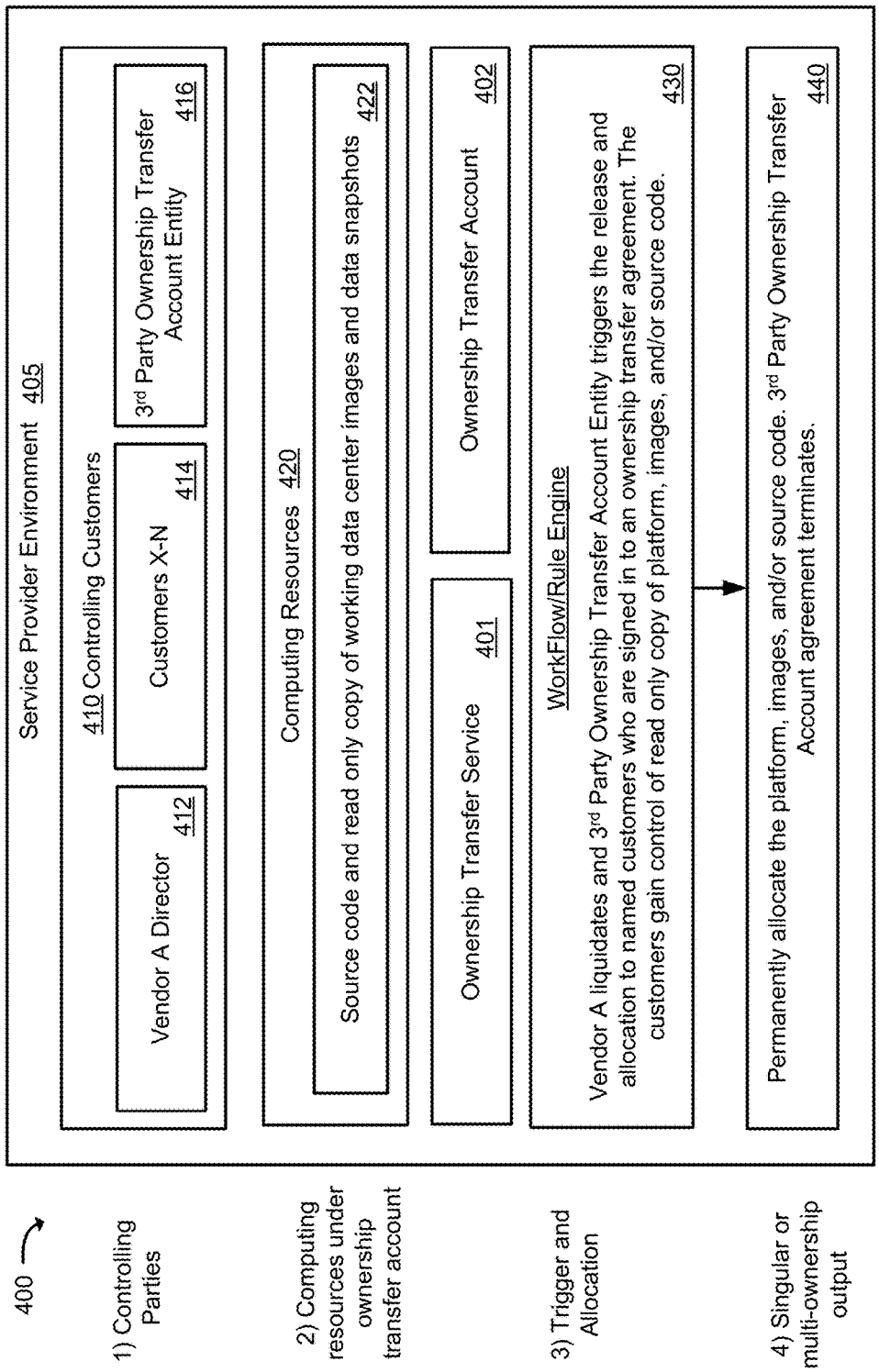
FIG. 4 is a block diagram that illustrates a system for reducing customer risk when using an ownership account transfer service for controlling and transferring computing resources in a service provider environment according to an example of the present technology.

FIG. 4 is a block diagram that illustrates a system 400 that reduces customer risk for providing an ownership account transfer service for controlling and transferring computing resources in a service provider environment according to an example of the present technology. The description and workflows of FIGS. 1-3 may also be included with and/or associated with the description and workflows of FIG. 4. The system 400 may be a service provider environment 405, and may include one or more controlling and transferring customers 410, such as for example, vendor A director 412, customers X-N 414 (e.g., identified customers of "X-N"), and a $3^{rd}$ party ownership transfer service account entity 416. The system 400 may include, computing resources 420, such as, for example, source code and or a read only copy of a working data center images and data snapshots, and/or other computing resources, such as accounts, data, working applications, other virtual or non-virtual assets. In one aspect, an ownership account transfer agreement that is maintained in, and controlled by, the $3^{rd}$ party ownership transfer service account entity 416 for maintaining control over the computing resources 420 may exists between each of the controlling and transferring customers 410. The system 400 may also include a workflow/rules engine 430 which may be associated with and used in conjunction with an ownership account transfer service 401. The ownership account transfer service 401 may be associated with a third party broker for brokering and maintaining the ownership account transfer service and an ownership transfer account 402.

In operation, the system 400 depicts multi-partisan control (e.g., control by the controlling and transferring customers 410) of items of value, such as the computing resources 420, which at rest or not in execution, are held in a controlled and limited access using an ownership transfer account by the ownership account transfer service 40. In other words, the controlling and transferring customers 410 may be customers over the computer resources 420. Using the workflow/rules engine 430, a triggering event can cause a release and/or allocation of the computing resources 420, by pre-determined customers (e.g., the controlling and transferring customers 410) based on the workflow/rules engine 430 with pre-defined set of triggers to release the computing resources from the ownership account transfer service 40 to a state no longer entirely controlled by ownership transfer account or the controlling and transferring customers 410.

For example, the workflow/rules engine 430 may detect vendor A director 412 liquidates and triggers a release. The $3^{rd}$ party ownership transfer service account entity 416 may release control over the computing resources 420 and allocate and/or transfer exclusive control over to one or more identified customers, such as, for example, identified customers X-N 414 that are signed into the ownership account transfer agreement.

As depicted in block 440, the ownership transfer service 40 of the service provider environment 405 may transfer permanent allocation over the computing resources 420, such as the source code and the controlling privileges account 422, to one or more of the identified customers X-N 414. Also, the ownership account transfer service agreement relating to control over the computing resources 420 by the $3^{rd}$ party ownership transfer service account entity 416 may be terminated.

Figure 5:
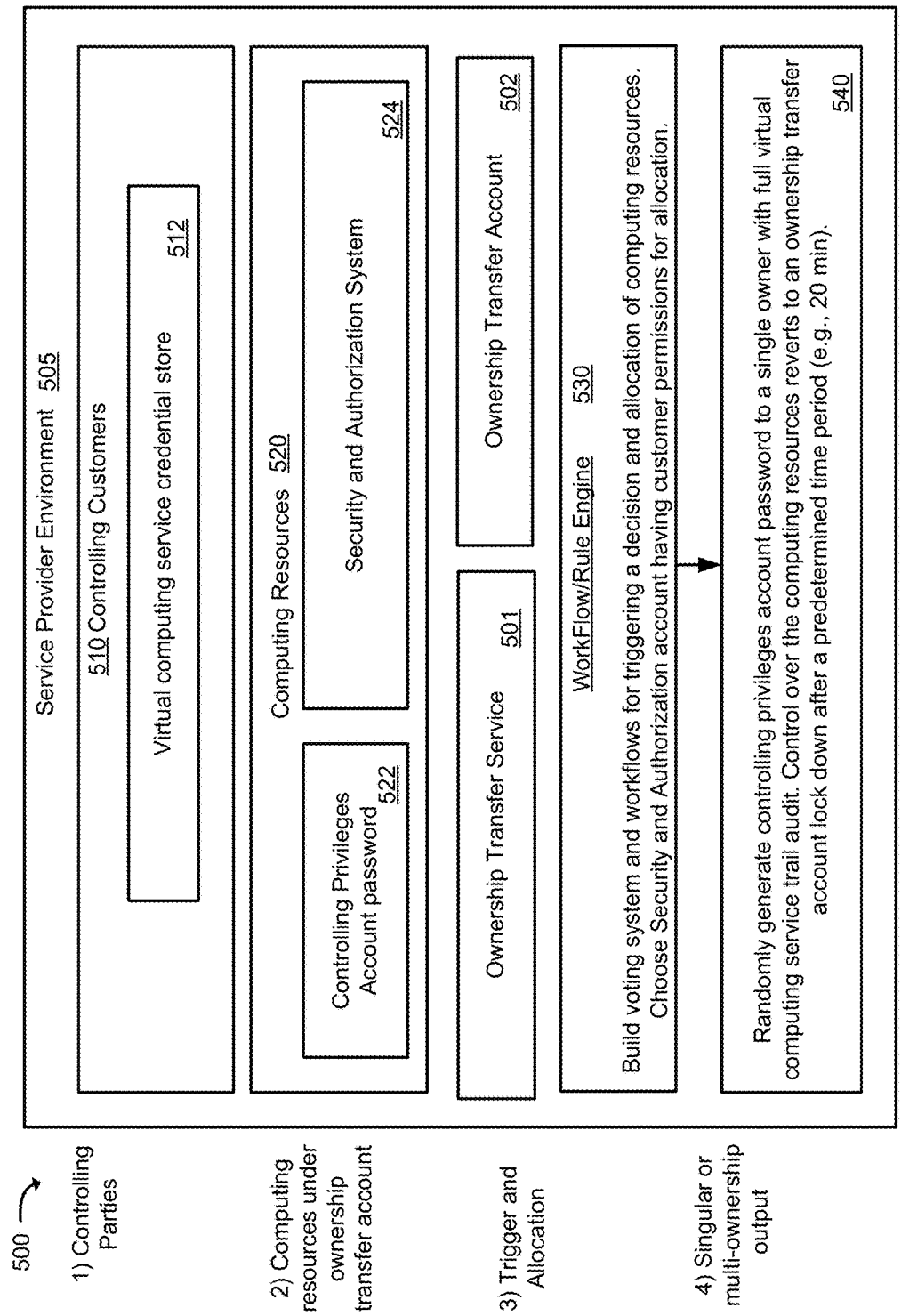
FIG. 5 is a block diagram that illustrates a system for providing an ownership account transfer service for controlling and transferring computing resources using a virtual computer service credential store in a service provider environment according to an example of the present technology.

Turning now to FIG. 5, a block diagram depicts a system 500 for providing an ownership account transfer service for controlling and transferring computing resources using a virtual computing service credential store in a service provider environment according to an example of the present technology. The description and workflows of FIGS. 1-4 may also be included with and/or associated with the description and workflows of FIG. 5. The system 500 may be a service provider environment 505, and may include one or more controlling and transferring customers 510, such as for example, virtual computing service credential store 512 (e.g., a security and authentication system). The system 500 may include, computing resources 520, such as, for example, a controlling privileges account password 522, a security and authentication system 524, which may be created with read only access to an security and authentication system and snapshot packages, and/or other computing resources, such as accounts, data, working applications, other virtual or non-virtual assets. In one aspect, the security and authentication system may allow customers having control over computing resources 520 to manage access permissions to the computing resources 520 in the service provider environment 505. The system 500 may also include a workflow/rules engine 530 which may be associated with and used in conjunction with an ownership account transfer service 501. The ownership account transfer service 501 may be associated with a third party broker for brokering and maintaining the ownership account transfer service and an ownership transfer account 502.

In operation, the system 500 depicts multi-partisan control (e.g., control by the controlling and transferring customers 510) of items of value, such as the computing resources 520, which at rest or not in execution, are held in a controlled and limited access environment using an ownership transfer account by the ownership account transfer service 50. In other words, the controlling and transferring customers 510 may be customers over the computer resources 520. Using the workflow/rules engine 530, a triggering event can cause a release and/or allocation of control over the computing resources 520, by pre-determined customers (e.g., the controlling and transferring customers 510) based on the workflow/rules engine 530 with pre-defined set of triggers to release the computing resources from the ownership account transfer service to a state no longer entirely controlled by ownership transfer account or the controlling and transferring customers 510.

For example, the workflow/rules engine 530 may build a voting system with workflows for triggering a decision to allocate and to transfer the control of the computing resources 520. In one aspect, the controlling and transferring customers 510 may choose a security and authentication account for transfer the control of the computing resources 520.

As depicted in block 540, the ownership transfer service 50 of the service provider environment 505 may transfer permanent allocation over the computing resources 520. Also, the ownership account transfer service 50 in the service provider environment 505 may provide a full virtual audit trail of an ownership transfer service. Upon the expiration of a predetermined time, such as, for example, upon the expiration of 20 minutes, the exclusive control may revert back to the ownership transfer account, which may locked down, in the service provider environment 505 with the controlling and transferring customers 510 resuming exclusive control over the computing resources 520.

Moreover, in one aspect, to undertake providing the ownership account transfer service, as described herein, controlling privileges accounts (such as root customer accounts) of the computing resources in the ownership transfer account may first be controlled by one or more controlling and transferring customers. Permission to transfer the control (such as exclusive control) over the controlling privileges accounts of computing resources from the controlling and transferring customers and allocate the exclusive control over the controlling privileges accounts of computing resources to a single controlling and transferring customer and/or a non-controlling and transferring or receiving customer may be granted by approval from at least one of the multiple customers. Alternatively, permission to allocate exclusive control over the controlling privileges accounts of computing resources may be granted by approval from a quorum vote of the multiple customers. Exclusive control over the computing resources may be transferred from the multiple customers to at least one of the customers. The exclusive control over the computing resources may be transferred from the multiple customers to at least one of the multiple of customers according to one or more workflows. Alternatively, the exclusive control over the computing resources may be transferred from the multiple customers to at least one non-customer according to the one or more workflows. A set of predefined rules and limitations, included in with and or associated with the one or more workflows, may be implemented to govern the exclusive control. In one aspect, the pre-defined set of triggers may be a vote amongst the controlling and transferring customers, an expiration of a predetermined period of time, and/or events outlined or defined within a third party ownership transfer account agreement that have workflows or rules created to match the agreement terms. For example, access to the computing resources may be terminated upon expiration of the predetermined time period.

In one aspect, a controlling privileges account password may be generated, for the computing resources, to be transferred with the exclusive control. An audit trail of the computing resources may be maintained. In one aspect, access to the controlling privileges accounts of computing resources may terminate upon a triggering event of the workflows. For example, access to the computing resources may terminate upon expiration of a predetermined time period. In one aspect, the exclusive control over the computing resources may be transferred for ready only access to the computing resources.

In one aspect, a triggering event for the workflows may be detected for transferring the exclusive control over the computing resources. At least one of a multiplicity of stages included in, and/or associated with, the workflows may be performed in order to transfer the exclusive control over the computing resources. The multiplicity of stages may include at least one of a single approval stage, a quorum approval stage, an action stage, and/or a wait stage. In one aspect, the exclusive control over the computing resources may be transferred from the multiplicity of customers to at least one of the multiplicity of customers, one or more receiving customer or non-customer, and/or an independent third party broker according to the workflows.

For example, in one aspect, the exclusive control over the computing resources may be transferred from the multiplicity of customers to at least one of the multiple customers, one or more receiving customers, and/or an independent third party broker according to receiving approval to transfer exclusive control by either a single approval stage or a quorum approval stage. The single approval stage may include an approval to transfer exclusive control over the computing resources by a single vote from one the multiple customers and the quorum approval stage is approval to transfer exclusive control over the computing resources by a quorum vote from the multiple customers.

Figure 6:
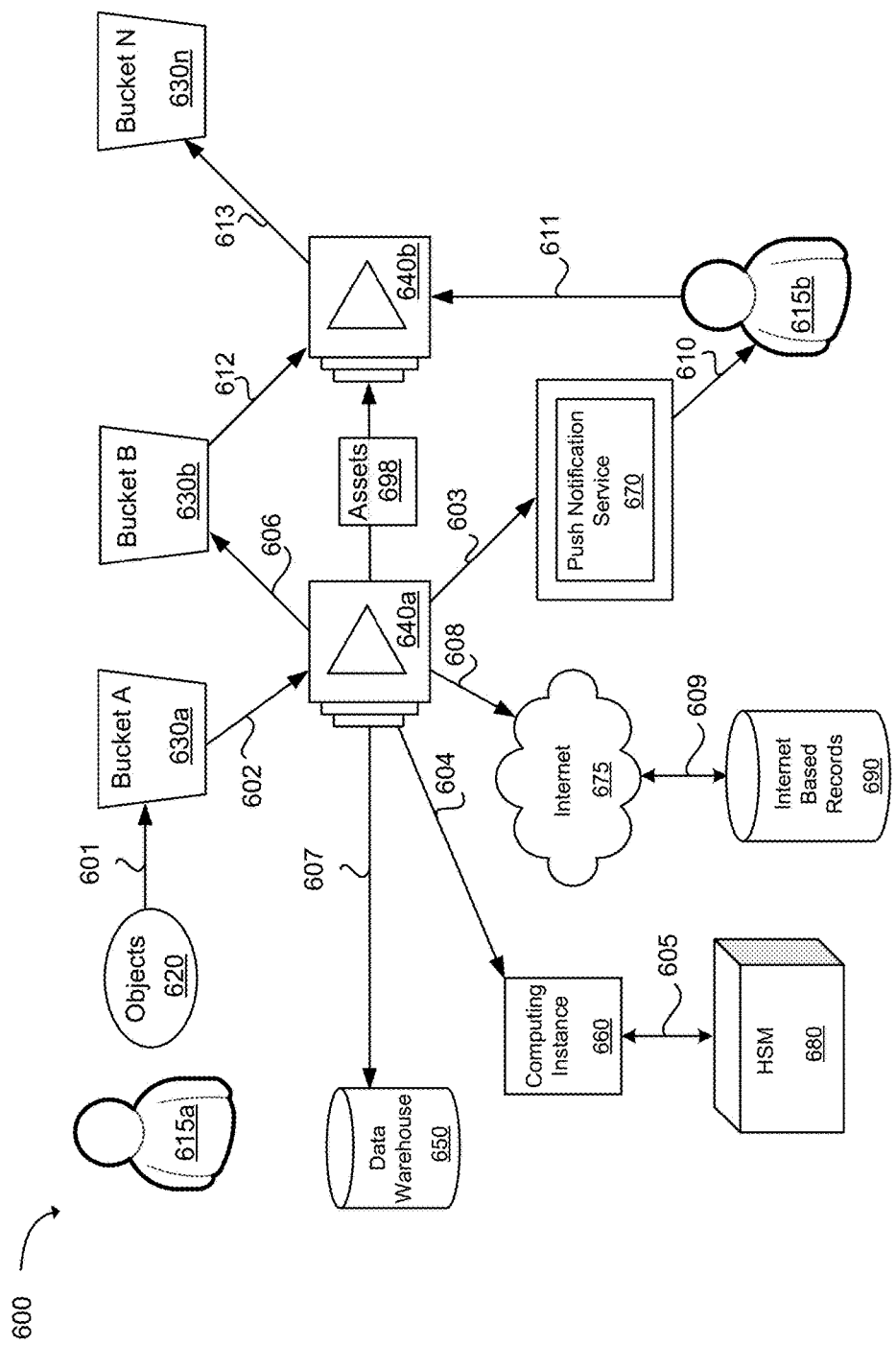
FIG. 6 is flow diagram that illustrates an approval stage for an ownership account transfer service using a single approval from multiple customers controlling and transferring computing resources in a service provider environment.

FIG. 6 is flow diagram that illustrates an approval stage workflow 600 providing an ownership account transfer service using a single approval from multiple customers controlling and transferring computing resources in a service provider environment. That is, FIG. 6 depicts the flow of data through a single approver stage, augmented with a number of optional capabilities.

In one aspect, data repositories may take the form of virtual computing buckets 630, such as virtual computing buckets 630a-n. In one aspect, the virtual computing buckets 640 may be virtualized storage in a service provider environment, which may include a virtual computing environment, where one or more objects 620 may be uploaded. The virtual computing buckets 630a-n may be chosen owing to their ability to be version-controlled, which enables a detailed history of transactions to be preserved without accidental deletion or overwrite, and lifecycle-managed, which enables the virtual computing buckets 630 contents to be transparently pushed to a data archiving and/or online backup storage system, which in turn may have write-once-read-many (WORM) storage and/or an immutable retention policy functionality. The virtual computing buckets 630 may also avoid issues of object or message duplication through a predefined workflow. However, it should be noted that other aspects of storage functionality may be implemented using a message queuing and delivery service, a workflow engine, or other virtual computing services available for processing and moving data between different virtual computing and storage services. However, it is considered that the virtual computing buckets 630 may provide the most efficient balance of ease of use and pluggable security capability.

As illustrated in FIG. 6, at action 601, a customer 615a (e.g., a submitter) may write an object 620 to the virtual computing bucket 630a. The customer 615a may be a customer, a software agent, and/or a representation of a previous workflow stage, such that the virtual computing bucket 630a shown as the first bucket in this workflow stage, is also the last bucket in a previous workflow stage (so if the previous workflow stage was also a single-approver stage virtual computing bucket 630a in the current stage, the virtual computing bucket 630a would also be virtual computing bucket, not shown, in a previous stage). In one aspect, the object 620 may be a data file, such as a Unix file, for the workflow that may contain a command or series of commands that the customer 615a desires to be executed in the context in one of the operation steps of the workflow. In other aspects, the objects 620 may also be a build file such as an service provider formation template (e.g., virtual computing provider formation template or scripting) to construct a virtual data center environment and launch computing assets or computing resources 698, or a list of existing computing assets or computing resources 698 and associated configurations thereof, which may be included in an ownership transfer service workflow.

In one aspect, a write operation may be performed by an application programming interface (API) of the virtual computing environment, which may constrain a set of authenticated customers authorized to write objects to the virtual computing bucket 630 and require that write operations be cryptographically signed with a secret access key of the virtual computing bucket 630 via a policy in a security and authentication system. The virtual computing bucket 630 may not be owned by the same account as customer 615a, who is the submitter. That is, a property of the bucket 630 is that a customer 615 in an account other than the account which owns the buckets 630 can make writes to the bucket 630 if appropriate permissions on the bucket 630 are in place. Hence, the present technology may enable the ownership transfer account framework to have a mandatory access control for each of the customers 615 of the computing assets or computing resources 698 being managed via the ownership transfer service, and the framework can be held and maintained in a separate "shadow account" to make the ownership transfer service immutable to or protected from ownership transfer account resource customers 615, and invisible to the customers 615 except for one write-only (non-interrogatable) interface through which ownership transfer service controls. Also, significant materials or computing resources can be injected into the ownership transfer service control processing framework.

The virtual computing bucket 630a may be a shared write-only cross-account bucket, such that a policy associated with the virtual computing bucket 630a, and the virtual computing bucket's 630a contents, are both invisible and immutable to the customer 615a (submitter) and all other customers in the submitter's account.

In another aspect, objects 620 may be written anonymously to the virtual computing buckets 630 (e.g., 630a-630n) via web POST requests (i.e., HTTP requests), mediated by the virtual computing bucket 630 policy applied to the virtual computing bucket 630 which may constrain source internet protocol addresses objects.

In action 602, an event of the object 620 that is being written, may be retrieved and processed by an event driven function 640a (e.g., a Lambda function), which has read privileges on the virtual computing bucket 630a. The event driven function 640a may be an event-driven compute framework, which may have event triggers that run customer-defined functions (e.g., functions currently in Java or node.js) when an event occurs. The event driven function 640a may have a trigger for a write event to one of the virtual computing buckets 630, and may be triggered by action 601 to run a function, which may perform actions 603, 604, 606, 607 and 608.

In action 603, the event driven function 640a may use the virtual computing service's API to push a notification message to a defined push notification service 670 to send individual messages or to fan-out messages to large numbers of recipients, such as to alert approver 615b and/or other appropriate entities to the effect that object 620 has been written to virtual computing bucket 630a. It should be noted that the computing assets or computing resources 698 may be moving and flowing into and out of each bucket 630 depending on a particular stage of the workflows as described herein. Moreover, the computing assets or computing resources 698 may be flowing through the workflows and each individual bucket 630. Alternatively, if the computing assets or computing resources 698 are services, then the commands used to manipulate the services may be flowing through the workflows. In another aspect, a template (e.g., a virtual computing formation template) may be used to manipulate the computing assets or computing resources 698 that are services. The asset control point (see asset control point 895 in FIG. 8) (e.g., control point form controlling computing assets and/or computing resources) may be automated workflows not involving approval mechanisms, which, for example, may proceed from start to finish and can create, use and delete other virtual computing resources such as computing instances. In short, the computing assets or computing resources 698 may 1) actually flow through the chain of buckets 630, 2) be referred to in each chain of the buckets 630, and/or 3) be soft-documented within each chain of the buckets 630.

Action 604 may be an optional step that may be performed, by which the event driven function 640a may invoke optional action 605 to enhance the evidential weight ascribable to the object 620 and the event of its placement in virtual computing bucket 630a. The event driven function 640a may write a copy of object 620 to a directory on computing instance 660, to which the event driven function 640a has write permissions.

In action 605, which may also be an optional step triggered by optional action 604, computing instance 660 takes its copy of object 620 and pushes it over a trusted network link to virtual computing hardware security module (HSM) appliance 680, which wraps the copy of object 620 in a cryptographically-strong timestamp signed with a nominated pre-stored key in the HSM 680 and returns the wrapped copy of object 620 to computing instance 660.

In one aspect, the virtual computing HSM 680 may establish a bidirectional cryptographic trust with computing instance 660 or other operating system (OS) instance and uses the bidirectional cryptographic trust, along with proprietary trusted network link software, to establish a virtual private network (VPN) between computing instance 660 and HSM 680. Secure timestamping and signing operations on data by the HSM 680 may be invoked using cryptography, public-key cryptography standards (PKCS) such as, for example, PKCS#11, Java Cryptography Extension (JCE) or Cryptographic Application Programming Interface (CAPI) API calls to the HSM 680 over the VPN. In one aspect, each of the timestamping and signing operations on data may not change the core content of object 620, but rather, the timestamping and signing operations prepend or append cryptographic data in a wrapping process that ensures that the composite wrapped object 620 may not be subsequently modified in terms of changing its core content or timestamp in an unauthorized manner, without further cryptographic operations incurring computational costs.

In action 606, the object 620 may be copied to second virtual computing bucket(s) 630b. In embodiments where actions 604 and actions 605 are included, the object 620 moved may be a "stamped and sealed" copy returned by the virtual computing hardware security module 680, and the move operation may be performed by computing instance 660, which may have privileges to write to virtual computing buckets 630b. In some aspects where optional actions 604 and 605 are not included, a direct copy of object 620 may be written to virtual computing buckets 630b by the event driven function 640a, which may have privileges to write to virtual computing buckets 630b.

In action 607, which is an optional step, a record of the object's 620 appearance in the virtual computing bucket 630a may be written by the event driven function 640a to a row in a table in a data warehouse 650, such as a fully managed, petabyte-scale data warehouse. Such a record of object 620's appearance may include a timestamp, the customer name (e.g., the submitter's customer name), and a cryptographic digest of object 620. While the action 607 is optional in the function of the workflow, a large number of objects may pass through the workflow during the lifetime of the action 607. Hence, having a long-term, readily searchable index of objects enhances the efficiency to the workflow's 600 owners, submitters and approvers.

In action 608, which is an optional step, a record of object 620 as written to virtual computing buckets 630b (so, object 620 is written to virtual computing bucket 630a unless the optional actions 604 and 605 were included, in which case the object 620 is cryptographically wrapped by virtual computing HSM 680) is written to an external service by event driven function 640a via the Internet 675.

It is appreciated that some workflow customers, such as customer 615a, may want to have a record, which is independent of the service provider environment of objects passing through the workflow 600, and this is the appropriate point at which to insert it. Action 609 may also be an optional step accompanying action 608, depicting an Internet-based records service 690 and a record being written to the Internet-based records service 690. In order to preserve the confidentiality of the data in the object 620, a cryptographic digest of the object 620 may be written, rather than the object 620. In one aspect, Internet-based records service 690 provides a web interface to a bitcoin like blockchain, where the blockchain may be a highly distributed, highly resilient mechanism of a record for transactions. Also, the Internet-based records service 690 may also being used for other purposes, such as a distributed, anonymous system of record (e.g., a notary service).

Returning to the approver workflow 600, action 603 may push a notification message to a defined push notification service 670. Action 610 shows the message being distributed by push notification service 670 so that by using Hypertext Transfer Protocol (HTTP), mobile phone push services, short message service (SMS), or (via optional simple email service "SES" integration) email to propagate the notification to a customer 615b, which may be an approver. The approver (e.g., customer 615b) may be single-approver and/or a multi-party approver that may be notified. However, in one aspect, the workflow 600 may proceed based on the decision of a first approver to chronologically respond.

The customer 615b may decide whether object 620 should continue to pass through the workflow 600 or terminate. While a notification may include a full copy of the object 620, the combination of object 630 size and delivery mechanism may prohibit a full copy, therefore, there may be a need, subject to one or more policies or rules, to give the approver/customer 615b read-only access to the object 620s stored in virtual computing buckets 630b. This can be achieved either by giving customer 615b read-only access to the object 620 subject to authorization in virtual computing buckets 630*b*'s policy, or by constructing a time-limited signed uniform resource identifier or web address (URL) in event driven function 640*a*, which may be propagated as part of the notification. This requires that the key name assigned to object 620 remain invariant throughout the object's 620 passage through virtual computing bucket 630*a*, optional computing instance 660 and virtual computing buckets 630*b*

In action 611, if the customer 615*b* decides to allow object 620 to pass through the workflow 600, the event driven function 640*b* may be invoked via an internet web page command line interface (CLI) and/or software development kit (SDK) interface which in turn calls the virtual computing service API, with an "approve" message including the key to object 620 in virtual computing bucket(s) 630*b*. The event driven function 640*b* moves object 620 from virtual computing buckets 630*b* to virtual computing bucket 630*n*, and may optionally write an "approved" record to the information about object 620's passage through the workflow in the data warehouse 650, as per action 607. Once the object 620 has been written to virtual computing bucket 630*n*, the action 611 may end.

If the approver/customer 615*b* decides not to allow object 620 to pass through the workflow 600, the approver/customer 615*b* can either do nothing and remain idle in which case the object 620 remains stalled in virtual computing buckets 630*b*, or the approver/customer 615*b* may invoke the event driven function 640*b* with a "block" message including the key to object 620 in virtual computing buckets 630*b*. The event driven function 640*b* deletes object 620 from virtual computing buckets 630*b*, and may optionally write a "blocked" record to the information about object 620's passage through the workflow in data warehouse 650, as per action 607. Once object 620 has been deleted from virtual computing buckets 630*b*, the action 612 ends.

Figure 7:
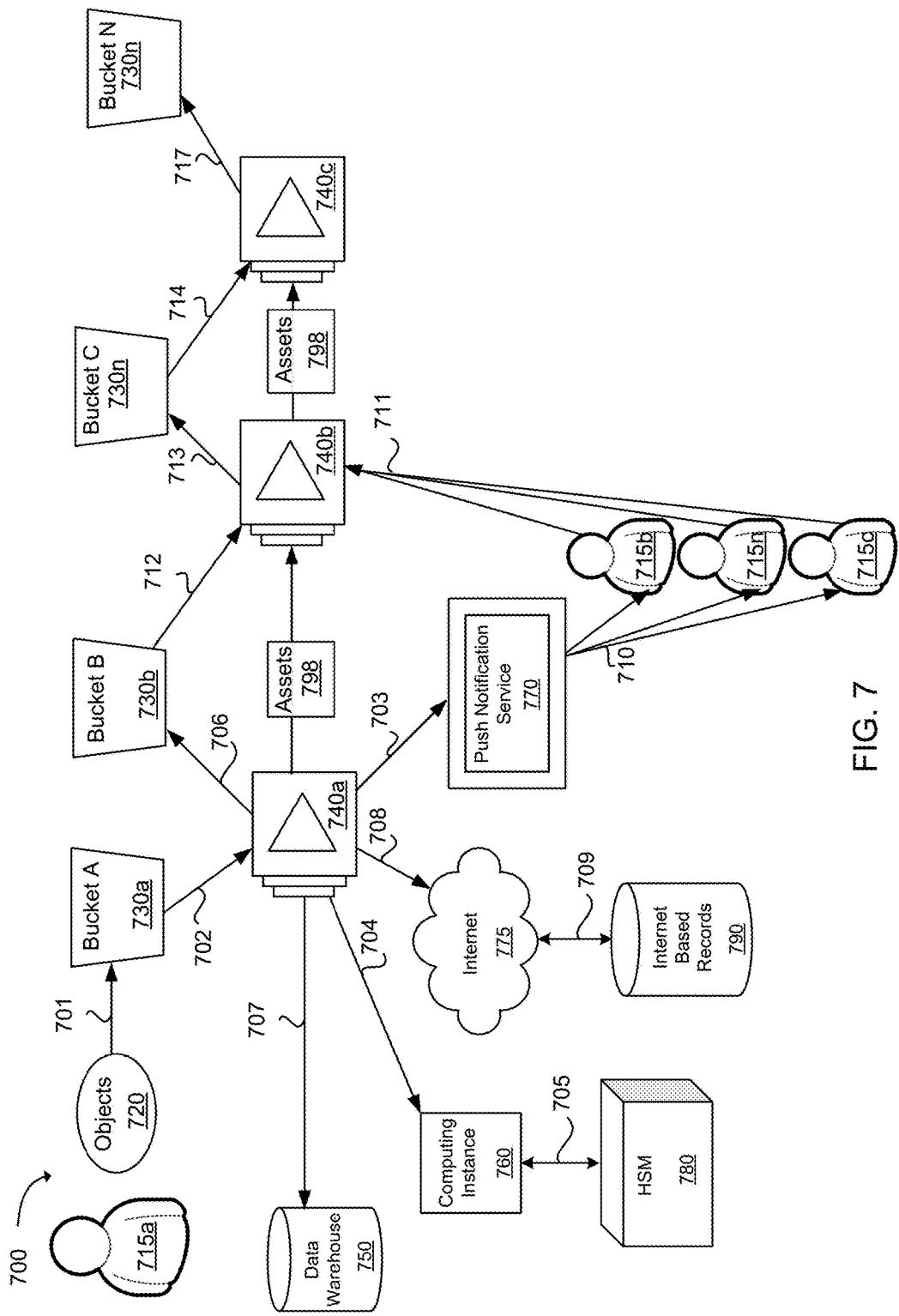
FIG. 7 is flow diagram that illustrates an approval stage for an ownership account transfer service using a quorum approval from multiple customers controlling and transferring computing resources in a service provider environment according to an example of the present technology.

FIG. 7 is flow diagram that illustrates an approval stage workflow 700 providing an ownership account transfer service using a quorum approval from multiple customers controlling and transferring computing resources in a service provider environment according to an example of the present technology. In other words, FIG. 7 depicts a flow of data through a single approver stage, augmented with a number of optional capabilities.

In this approval stage workflow 700, data repositories may take the form of Virtual computing buckets. In this first embodiment, the data repositories take the form of virtual computing buckets 730, such as virtual computing buckets 730*a-n*. In one aspect, the virtual computing buckets 740 are storage in a virtual computing environment where one or more objects 720 may be uploaded. The virtual computing buckets 730 may be chosen owing to their ability to be version-controlled, which enables a detailed history of transactions to be preserved without accidental deletion or overwrite, and lifecycle-managed, which enables the virtual computing buckets 730 contents to be transparently pushed to data archiving and/or online backup storage, which in turn may have write-once-read-many (WORM) storage and an immutable retention policy functionality. The virtual computing buckets 730 may also avoid issues of object or message duplication through a predefined workflow. However, it should be noted that other embodiments could be implemented using Simple Queuing or Simple Workflow, or other virtual computing services available for processing and moving data between different virtual computing and storage services. However, it is considered that the virtual computing buckets 730 can provide the most efficient balance of ease of use and pluggable security capability.

As illustrated in FIG. 7, at action 701, a customer 715*a* (e.g., a submitter) writes an object 720 to the virtual computing bucket 730*a*. The customer 715*a* may be a customer, a software agent, and/or a representation of a previous workflow stage, such that the virtual computing bucket 730*a* shown as the first bucket in the workflow 700 stage, may also the last bucket in a previous workflow stage (so if the previous workflow stage was also a single-approver stage virtual computing bucket 730*a* in the current stage would also be virtual computing bucket 730*j* (not shown) in a previous stage). In one aspect, the object 720 may be a data file, such as a Unix file, for the workflow that may contain a command or series of commands that the customer 715*a* desires to be executed in the context in one of the operation steps of the workflow. In other aspects, objects 720 may also be a build file such as an service provider formation template (e.g., virtual computing provider formation template) to construct a virtual data center environment and its computing assets or computing resources 798, or a list of existing computing assets or computing resources 798 and associated configurations thereof, which may be included in an ownership transfer service workflow.

In one aspect, a write operation may be performed by an application programming interface (API) of the virtual computing environment, which may constrain a set of authenticated customers 715 authorized to write objects to the virtual computing bucket 730 and require that write operations be cryptographically signed with a secret access key of the virtual computing bucket 730 via policy in a security and authentication system. The virtual computing bucket 730 may not be owned by the same account, which knows the customer, such as customer 715*a*, who is the submitter. The virtual computing bucket 730*a* may be a shared write-only cross-account, such that a policy associated with the virtual computing bucket 730*a*, and the virtual computing bucket's 730*a* contents, are both invisible and immutable to the customer 715*a* (submitter) and all other customers in the submitter's account.

In another embodiment, objects 720 may be written anonymously to the virtual computing buckets 730 (e.g., 730*a*-730*c*) via web post requests, mediated by the virtual computing bucket 730 policy applied to the virtual computing bucket 730 which may constrain source internet protocol addresses objects.

In action 702, the event of the object 720 that is being written, may be retrieved and processed by an event driven function 740*a*, which has read privilege on virtual computing bucket 730*a*. The event driven function 740*a* may be an event-driven compute framework, which may have event triggers that run customer-defined functions (e.g., functions currently in Java or node.js) when an event occurs. The event driven function 740*a* may have a trigger for a write event to one of the virtual computing buckets 730, and may be triggered by action 701 to run a function, which may perform actions 703, 704, 706, 707 and 708.

In action 703, the event driven function 740*a* may use the virtual computing service's API to push a notification message to a defined push notification service 770 to send individual messages or to fan-out messages to large numbers of recipients, such as to alert approver 715*b* and/or other appropriate entities to the effect that object 720 has been written to virtual computing bucket 730*a*. It should be noted that the computing assets or computing resources 798 may be moving and flowing into and out of each bucket 730 depending on a particular stage of the workflows as described herein. Moreover, the computing assets or computing resources 798 may be flowing through the workflows and each individual bucket 730. Alternatively, if the computing assets or computing resources 798 are services, then the commands required to manipulate the services may be flowing through the workflows. In another aspect, a template (e.g., a virtual computing formation template) may be used to manipulate the computing assets or computing resources 798 that are services. The asset control point (e.g., control point form controlling computing assets and/or computing resources and see FIG. 8 asset control point 895) may be automated workflows not involving approval mechanisms, which, for example, may proceed from start to finish and can create, use and delete other virtual computing resources such as computing instances. In short, the computing assets or computing resources 798 may 1) actually flow through the chain of buckets 730, 2) be referred to in each chain of the buckets 730, and/or 3) be soft-documented within each chain of the buckets 730.

Action 704 may be an optional step that may be performed, by which the event driven function 740a may invoke optional action 705 to enhance the evidential weight ascribable to the object 720 and the event of its placement in virtual computing bucket 730a. The event driven function 740a may write a copy of object 720 to a directory on a computing instance 760, to which the event driven function 740a has write permissions.

In action 705, which may also be an optional step triggered by optional Action 704, computing instance 760 takes its copy of object 720 and pushes it over a trusted network link to virtual computing hardware security module (HSM) appliance 780, which wraps the copy of object 720 in a cryptographically-strong timestamp signed with a nominated pre-stored key in the HSM 780 and returns the wrapped copy of object 720 to computing instance 760. In one aspect, the virtual computing HSM 780 may establish a bidirectional cryptographic trust with computing instance 760 or other operating system (OS) instance and uses the bidirectional cryptographic trust, along with proprietary trusted network link software, to establish a virtual private network (VPN) between computing instance 760 and HSM 780. Secure timestamping and signing operations on data by the HSM 780 may be invoked using cryptography, public-key cryptography standards (PKCS) such as, for example, PKCS#11, Java Cryptography Extension (JCE) or Cryptographic Application Programming Interface (CAPI) API calls to the HSM 780 over the VPN. In one aspect, each of the timestamping and signing operations on data may not change the core content of object 720, but rather, the timestamping and signing operations prepend or append cryptographic data in a wrapping process that ensures that the composite wrapped object 720 may not be subsequently modified in terms of changing its core content or timestamp in an unauthorized manner, without further cryptographic operations incurring computational costs.

In action 706, the object 720 may be copied to a second virtual computing buckets 730b. In embodiments where actions 704 and actions 705 are included, the object 720 moved may be the "stamped and sealed" copy returned by the virtual computing hardware security module 780, and the move operation may be performed by computing instance 760, which may have privileges to write to virtual computing buckets 730b. In embodiments where optional actions 704 and 705 are not included, a direct copy of object 720 may be written to virtual computing buckets 730b by the event driven function 740a, which has privilege to write to virtual computing buckets 730b.

In action 707, which is an optional step, a record of object 720's appearance in virtual computing bucket 730a is written by the event driven function 740a to a row in a table in a data warehouse 750, such as a fully managed, petabyte-scale data warehouse. Such a record of object 720's appearance may include a timestamp, the customer's 715a name (e.g., the submitter's customer name), and a cryptographic digest of object 720. While action 707 may not be strictly required for the function of the workflow 700, it should be noted that it is expected that a large number of objects may pass through the workflow 700 during the lifetime of action 707. Hence, having a long-term, readily searchable index of objects enhances the efficiency to the workflow's 700 owners, submitters and approvers.

In action 708, which is an optional step, a record of object 720 as written to virtual computing buckets 730b (so, object 720 as written to virtual computing bucket 730a unless the optional actions 704 and 705 were included, in which case the object is as cryptographically wrapped by the HSM module 780 is written to an external service by the event driven function 740a via the Internet. It is appreciated that some workflow 700 customers, such as 715a, may want to have a record, which is independent of the service provider environment of objects passing through the workflow, and this is the appropriate point at which to insert it.

In action 709 may also be an optional step accompanying action 708, depicting an Internet-based 775 records service 790 and a record being written to the Internet-based records service 790. In order to preserve the confidentiality of the data in the object 720, a cryptographic digest of the object 720 may be written, rather than the object 720. In one aspect, Internet-based records service 790 provides an internet application interface to a bitcoin blockchain, where the blockchain may be a highly distributed, highly resilient mechanism of a record for bitcoin transactions. Also, the Internet-based records service 790 may also being used for other purposes, such as a distributed, anonymous system of record (e.g., a notary service).

Returning to the approver workflow 700, action 703 may push a notification message to a defined push notification service 770. Action 710 shows the message being distributed by push notification service 770 so that by using Hypertext Transfer Protocol (HTTP), mobile phone push services, short message service (SMS) or (via optional simple email service "SES" integration) email, propagates the notification to a customer 715b, which may be an approver. An approver (e.g., customer 715b) may be single-approver and/or a multi-party approver that may be notified. However, in one aspect, the workflow 700 may proceed based on the decision of a first approver, such as customer 715b, to chronologically respond.

The customer 715b, may decide whether object 720 should continue to pass through the workflow 700 or terminate. While a notification may include a full copy of the object 720, the combination of object 720 size and delivery mechanism may prohibit a full copy, therefore, there may be a need, subject to one or more policies or rules, to give the approver/customer 715b read-only access to the object 720s stored in virtual computing buckets 730b. This can be achieved either by giving customer 715b read-only access to the object 720 subject to authorization in virtual computing buckets 730b's policy, or by constructing a time-limited signed uniform resource identifier or web address (uniform resource locator "URL") in event driven function 740a, which may be propagated as part of the notification. This requires that the key name assigned to object 720 remain invariant throughout the object's 720 passage through virtual computing bucket 730a, optional computing instance 760 and virtual computing buckets 730b.

In action 711, the approver/customers 715*b*, 715*n*, and 715*c* may each decide whether object 720 should continue to pass through the workflow 700 or be terminated. While a notification may include a full copy of the object 720, the combination of object 730 size and delivery mechanism may prohibit a full copy, therefore, there may be a need, subject to one or more policies or rules, to give the approver/customer 715*b*, 715*n*, and/or 715*c* read-only access to the object 720 stored in virtual computing buckets 730*b*. This can be achieved either by giving customer 715*b* read-only access to the object 720 subject to authorization in virtual computing buckets 730*b*'s policy, or by constructing a time-limited signed uniform resource identifier or web address (URL) in event driven function 740*a*, which may be propagated as part of the notification. This requires that the key name assigned to object 720 remain invariant throughout the object's 620 passage through virtual computing bucket 730*a*, optional computing instance 760 and virtual computing buckets 730*b*.

In action 711, if approver/customer 715*b*, 715*n*, and/or 715*c* decides to allow object 720 to pass through the workflow 700, they invoke event driven function 740*b* via an internet web page command line interface (CLI) and/or software development kit (SDK) interface which in turn calls the virtual computing service API, with an "approve" message including the key to object 720 in virtual computing buckets 730*b*. The event driven function 740*b* moves object 720 from virtual computing buckets 730*b* to virtual computing bucket 730*c* in action 613, and may optionally write an "approved" record to the information about object 720's passage through the workflow in data warehouse 750, as per action 707. Each of the approver/customer 715*b*, 715*n*, and/or 715*c* response may include further data such as a private key k, or a pointer to where that key may be accessed if object 720 involves performing operations on a secret store to which they each have an element of authorization to access (such as a key k in a Shamir or similar "k of n" key sharing system. Each action 713 may write to virtual computing bucket 730*c* and invoke the event driven function 740*b*, in action 714.

The event driven function 740*b* may identify the object's 720 name that has been written and may also count how many copies of object 720 are stored in virtual computing bucket 730, according to a virtual computing service's version enumeration mechanism. When a number of copies of the object 720 exceeds a predetermined number, such that when a quorum of approvers (e.g., approver/customer 715*b*, 715*n*, and/or 715*c*) as determined by the maintainer(s) of the workflow has been reached, event driven function 740*c* may write 717 a single copy of object 720 to virtual computing bucket 730*n*, unless it is determined that additional data such as access keys are included in the responses, in which case the instances of object 720 are concatenated into one object 720 and written to virtual computing bucket 730*n*. The maintainers may be those entities in the ownership transfer service, such as a law firm, a solicitor, a notary, a bank, insurance entity, a management company, receivers, an appointed arbiter, and/or a consortium thereof of the ownership transfer service The event driven function 740*c* may then make a record (in data warehouse 750 as per action 707, or elsewhere as configured) of the fact that object 720's passage through the workflow 700 has been approved and the write to virtual computing bucket 730*c* that may be the output of virtual computing bucket 730*b*. Once object 720 has been deleted from virtual computing buckets 730*c*, the action 713 may end.

If any of the approver/customer's 715*b*, 715*n*, and/or 715*c* decide not to allow object 720 to pass through the workflow 700, the approver/customer 715*b*, 715*n*, and/or 715*c* can either do nothing, in which case the approver/customer 715*b*, 715*n*, and/or 715, do not event driven function 740*b* and the number of potential copies of object 720 in virtual computing bucket 730*c* may be reduced by a factor of 1, so the number of potential copies of object 720 may not reach the threshold count required by event driven function 740*c*, otherwise the approver/customer 715*b*, 715*n*, and/or 715 can invoke event driven function 740*b* with a "block" message including the key to object 720 in virtual computing buckets 730*b*. The event driven function 740*b* may optionally write a "blocked" record to the information about object 720's passage through the workflow in data warehouse 750, as per Action 707.

If there is an insufficient number of approver/customer's 715*b*, 715*n*, and/or 715*c* to invoke event driven function 740*b* to approve the passage of object 720 through the actions 712, 713, the workflow 700 may end with object 720 stalled in virtual computing buckets 730*b*, and 0 or more "blocked" records may be stored in data warehouse 750, which may optionally be retrieved and processed by some periodically-invoked reaping mechanism (not shown) to delete objects which have been blocked.

Figure 8:
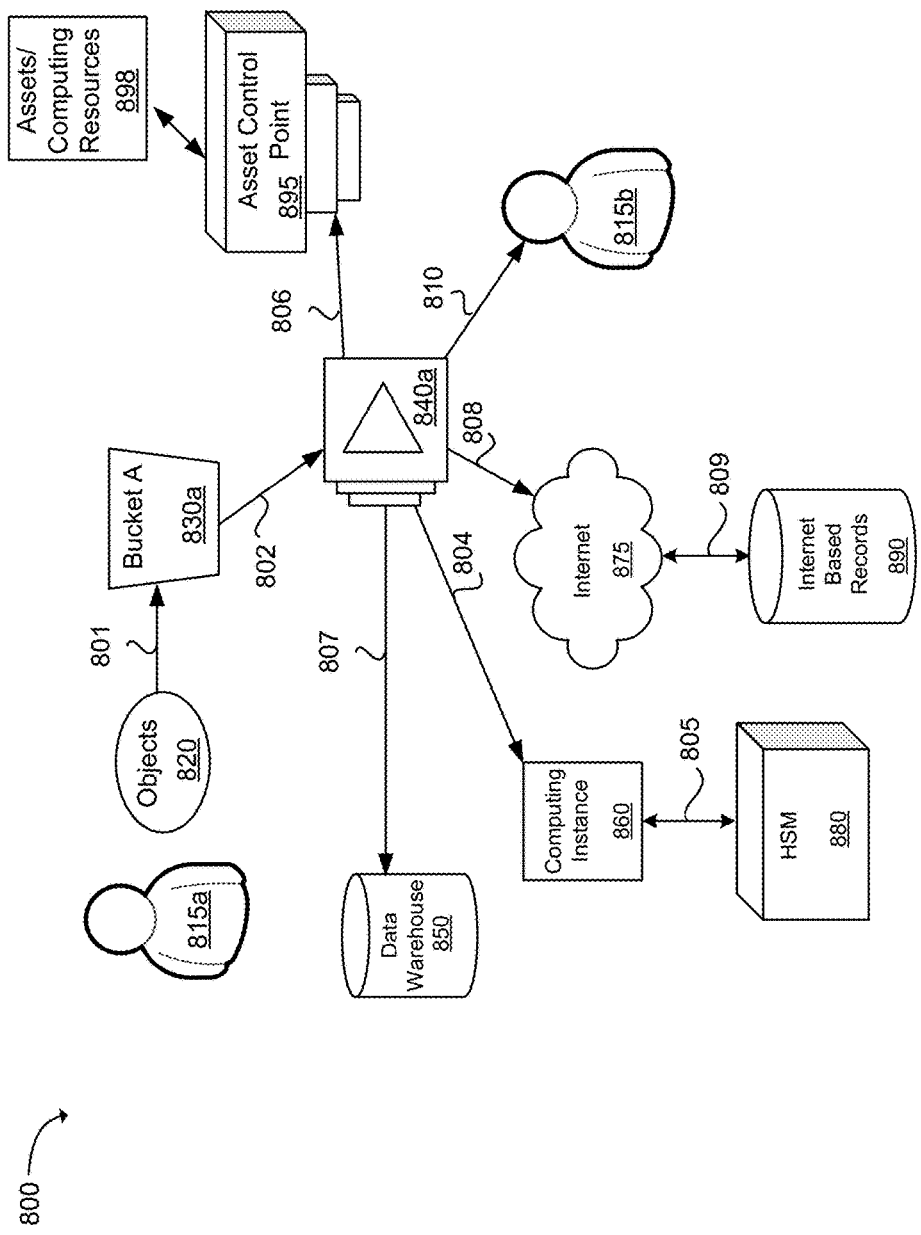
FIG. 8 is flow diagram that illustrates a final approval stage having optional capabilities for providing an ownership account transfer service for controlling and transferring computing resources in a service provider environment according to an example of the present technology.

Turning now to FIG. 8, a flow diagram depicts a final approval stage workflow 800 having optional capabilities for providing an ownership account transfer service for controlling and transferring computing resources in a service provider environment according to an example of the present technology. More specifically, FIG. 8 depicts the flow of data through the final approval stage workflow 800, augmented with a number of optional capabilities. That is, the final approval stage workflow 800 may be the final stage in approval workflows, after all approvals and waits have occurred and been successfully executed, such as those workflows described in FIGS. 6-7.

In action 801, an object 820 may be written by a previous workflow action to virtual computing buckets 830, such as virtual computing buckets 830*a-n*. In one aspect, the object 820 may be a data file, such as a Unix file, for the workflow that may contain a command or series of commands that the customer 815*a* desires to be executed in the context in one of the operation steps of the workflow. In other aspects, objects 820 may also be a build file such as an service provider formation template (e.g., virtual computing provider formation template) to construct a virtual data center environment and its computing assets or computing resources 898, or a list of existing computing assets or computing resources 898 and associated configurations thereof, which may be included in an ownership transfer service workflow.

In one aspect, a write operation may be performed by an application programming interface (API) of the virtual computing environment, which may constrain a set of authenticated customers authorized to write objects to the virtual computing bucket 830 and require that write operations be cryptographically signed with a secret access key of the virtual computing bucket 830 via policy in an security and authentication system.

The virtual computing bucket 830 may not be owned by the same account, which knows and identifies the customer, such as customer 815*a*, who is the submitter. The virtual computing bucket 830*a* may be a shared write-only cross-account, such that a policy associated with the virtual computing bucket 830*a*, and the virtual computing bucket's 830*a* contents, are both invisible and immutable to the customer 815*a* (submitter) and all other customers in the submitter's account. In another embodiment, objects 820 may be written anonymously to the virtual computing buckets 830 (e.g., 830*a*-830*n*) via web post requests, and mediated by the virtual computing bucket 830 policy applied to the virtual computing bucket 830 which may constrain source internet protocol addresses objects.

In action 802, the event of the object 820 that is being written, may be retrieved and processed by an event driven function 840*a*, which has read privilege on virtual computing bucket 830*a*. The event driven function 840*a* may be an event-driven compute framework, which may have event triggers that run customer-defined functions (e.g., functions currently in Java or node.js) when an event occurs. The event driven function 840*a* may have a trigger for a write event to one of the virtual computing buckets 830, and may be triggered by action 801 to run a function, which may perform actions 802, 804, 806, 807 and 808.

In action 803, the event driven function 840*a* may use the virtual computing service's API to push a notification message to a defined push notification service 810 to send individual messages or to fan-out messages to large numbers of recipients, such as to alert customer (e.g., approver) 815*b* and/or other appropriate entities to the effect that object 820 has been written to virtual computing bucket 830*a*.

In action 805, which may also be an optional step triggered by optional action 804, computing instance 860 takes its copy of object 820 and pushes it over a trusted network link to virtual computing hardware security module (HSM) appliance 880, which wraps the copy of object 820 in a cryptographically-strong timestamp signed with a nominated pre-stored key in the HSM 880 and returns the wrapped copy of object 820 to computing instance 860. In one aspect, the virtual computing HSM 880 may establish a bidirectional cryptographic trust with computing instance 860 or other operating system (OS) instance and uses the bidirectional cryptographic trust, along with proprietary trusted network link software, to establish a virtual private network (VPN) between computing instance 860 and HSM 880. Secure timestamping and signing operations on data by the HSM 880 may be invoked using cryptography, public-key cryptography standards (PKCS) such as, for example, PKCS#11, Java Cryptography Extension (JCE) or Cryptographic Application Programming Interface (CAPI) API calls to the HSM 880 over the VPN. In one aspect, each of the timestamping and signing operations on data may not change the core content of object 820, but rather, the timestamping and signing operations prepend or append cryptographic data in a wrapping process that ensures that the composite wrapped object 820 may not be subsequently modified in terms of changing its core content or timestamp in an unauthorized manner, without further cryptographic operations incurring computational costs.

In action 806, the event driven function 840*a* causes the actions of the object 820 to be performed. In one aspect, this is done by invoking an asset control point 895, which may be a virtual computing services available for processing and moving data between different virtual computing and storage services. That is, the asset control point 895 is moving one or more computing assets or computing resources 898. It should be noted that if the computing assets or computing resources 898 are files then the computing assets or computing resources 898 may be flowing through the workflows and each individual bucket 830. Alternatively, if the computing assets or computing resources 898 are services, then the commands required to manipulate the services may be flowing through the workflows. In another aspect, a template (e.g., a virtual computing formation template) may be used to manipulate the computing assets or computing resources 898 that are services. In short, the computing assets or computing resources 898 may 1) actually flow through the chain of buckets 830, 2) be referred to in each chain of the buckets 830, and/or 3) be documented (such as soft-documented that is an electronic version of the document) within each chain of the buckets 830.

In an alternative aspect, objects, such as the computing assets or computing resources 898, which move through the buckets 830 may also define what each of the end operations and/or workflow triggers. Also, an ownership transfer service that provides for secure, transfer of exclusive control over the computing assets or computing resources 898 (e.g., virtual computing resources) may itself move through the workflow operations, such as being transferred between each of the buckets 830. For example, at least one ownership transfer account service may be include in the workflows for transferring exclusive control over the computing resources from the plurality of customers to at least one of the plurality of customers. In one aspect, for example, the ownership transfer account service that is included in the workflows may trigger an alternative ownership transfer account service, executing as security layer for transferring exclusive control over the computing resources from the plurality of customers to at least one of the plurality of customers.

In one aspect, the customer 815 may also execute one or more virtual computing environments in parallel to allow the customer 815 to inspect, verify, and/or determine that each of the virtual computing environments are acceptable to the customer 815 and/or functioning properly.

The asset control point 895 (e.g., control point for controlling computing assets and/or computing resources) may be automated workflows not involving approval mechanisms, which, for example, may proceed from start to finish and can create, use and delete other virtual computing resources such as computing instances. The event driven function 840*a* may perform actions associated with a subset of virtual computing resources, provided those actions require less than sixty (60) seconds (s) to complete. However, the asset control point 895 may involve further services and remain active and available as long as is necessary for to complete one or more workflows. As such, an asset control point 895 may be invoked and built from the event driven function 840*a*. Both the event driven function 840*a* and the asset control point 895 may be invoked with any permissions that the event driven function 840*a* or pipeline owner has the privilege to grant the permission.

In one aspect, the asset control point 895 may also be configured to 1) write data to data warehouse 850 as per action 807, 2) publish notifications to push notification service 870 as per action 802, 3) have data encrypted, 4) decrypt or sign as per actions 804 and 805, and 5) push digests to third-party notary services as per action 808 and 809. It may be expected that some set of the actions, such as actions 804, 805, 808 and/or 809 may be performed, in order to reflect the success or failure of the operations described in object 820. Action 806 may be the final action in the execution path of the workflow 800, and the workflow 800 may end when action 806 completes.

Where the purpose of the workflow 800 is to transfer ownership of computing assets or computing resources 898 from one customer 815 to another, it should be noted that, as well as controlling privileges passwords, a service provider environment service may also offer and recommend the use of multi-factor authentication ("MFA") as an account security measure to mitigate the risk of password-guessing attacks. MFA may take the form of a one-time password system, either time-based or event-based, involving an iterated hashing process on a unique secret shared between an authentication service and a token held by the user. The token can either be a hardware device or a software program running on a consumer device, such as a smartphone. Server-side applications to support hardware tokens can ship with a database table, which maps secrets to device serial numbers, and soft tokens may require the user to enter a secret supplied by the server in the form of a quick response (QR) code or an alphanumeric string.

If the controller of computing assets or computing resources 898, transferred by the workflow 800 system, are using the MFA to protect the account of the computing assets or computing resources 898 and are unable or unwilling to produce a token of the computing assets or computing resources 898, a new token can be issued which also has a copy held in the account hosting the workflow system; as part of the asset control point 895 and for reference by the asset control point 895, a server instance can be installed and configured with a soft token service, and loaded with the secret used by the initial asset user's token. This enables the workflow 800 to act on an account which is using the MFA.

In action 807, which is an optional step, a record of object 820's appearance in virtual computing bucket 830a may be written by the event driven function 840a to a row in a table in a data warehouse 850, such as a fully managed, petabyte-scale data warehouse. Such a record of object 820's appearance may include a timestamp, the customer's 815a customer name (e.g., the submitter's customer name), and a cryptographic digest of object 820. While action 807 is not strictly required for the function of the workflow 800, it should be noted that it is expected that a large number of objects may pass through the workflow 800 during the lifetime of action 807. Hence, having a long-term, readily-searchable index of objects enhances the efficiency to the workflow's 800 owners, submitters and approvers.

In action 808, which is an optional action step, a record of object 820 as written to virtual computing buckets 830b is written to an external service by event driven function 840a via the Internet 875. For example, the object 820 may be written to virtual computing bucket 830a unless the optional actions 804 and 805 were included, in which case the object is as cryptographically wrapped by virtual computing hardware security module 880. It is appreciated that some workflow customers may want to have a record, which is independent of the virtual computing service environment of objects passing through the workflow, and this is the appropriate point at which to insert it.

Action 809 may also be an optional action step accompanying action 808, depicting an Internet-based records service 890 and a record being written to the Internet-based records service 890. In order to preserve the confidentiality of the data in the object 820, a cryptographic digest of the object 820 may be written, rather than the object 820. In one aspect, Internet-based records service 890 provides a web interface to a bitcoin like blockchain, where the blockchain may be a highly-distributed, highly-resilient mechanism of a record for bitcoin transactions. Also, the Internet-based records service 890 may also being used for other purposes, such as a distributed, anonymous system of record (e.g., a notary service).

Figure 9:
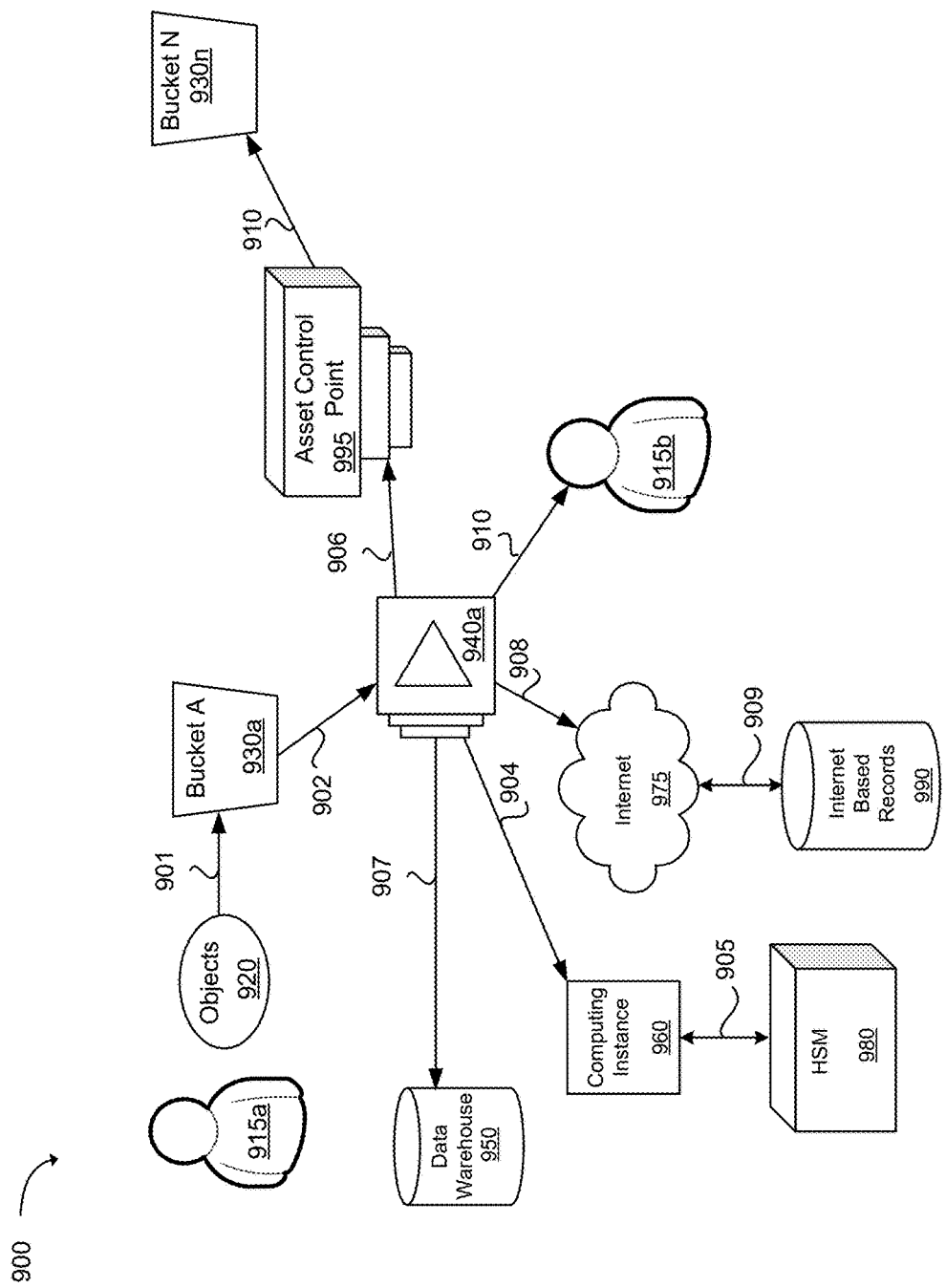
FIG. 9 is flow diagram that illustrates a wait stage having optional capabilities for an ownership account transfer service for controlling and transferring computing resources in a service provider environment according to an example of the present technology.

FIG. 9 is flow diagram that illustrates a wait stage workflow 900 having optional capabilities for providing an ownership account transfer service for controlling and transferring computing resources in a service provider environment according to an example of the present technology.

That is, FIG. 9 depicts the flow of data through wait stage workflow 900, augmented with a number of optional capabilities.

In one aspect, the data repositories take the form of virtual computing buckets 930, such as virtual computing buckets 930a-n. In one aspect, the virtual computing buckets 940 are storage in a virtual computing environment where one or more objects 920 may be uploaded. The virtual computing buckets 930 may be chosen owing to their ability to be version-controlled, which enables a detailed history of transactions to be preserved without accidental deletion or overwrite, and lifecycle-managed, which enables the virtual computing buckets 930 contents to be transparently pushed to data archiving and/or online backup storage, which in turn may have write-once-read-many (WORM) storage and an immutable retention policy functionality. The virtual computing buckets 930 may also avoid issues of object or message duplication through a predefined workflow. However, it should be noted that other embodiments could be implemented using Simple Queuing or Simple Workflow, or other virtual computing services available for processing and moving data between different virtual computing and storage services. However it is considered that the virtual computing buckets 930 provide the most efficient balance of ease of use and pluggable security capability.

As illustrated in FIG. 9, at action 901, an object 920 may be written to the virtual computing bucket 930a as a result of an approval of a previous workflow stage (e.g., see FIG. 6, 7, or 8). The virtual computing bucket 930a is depicted, by way of example only, as the first bucket in the wait stage workflow 900, but may be the last bucket in a previous workflow stage (e.g., see FIG. 6, 7, or 8). For example, if a previous workflow stage was a single-approver stage, virtual computing bucket 930a in the current stage may also be virtual computing bucket 930n in the previous stage.

In one aspect, the object 920 may be a data file, such as a Unix file, for the workflow 900 that may contain a command or series of commands that the customer 915a desires to be executed in the context in one of the operation steps of the workflow.

In one aspect, the objects 920 may, for the workflow 900, contain a command or series of commands that the customer 915a desires to be executed in the context in one of the operation steps of the workflow 900. In other aspects, the objects 920 may also include files such as an service provider formation template (e.g., virtual computing provider formation template) to construct a virtual data center environment and computing assets or computing resources 898, or a list of existing computing assets or computing resources 898 and associated configurations thereof, which may be included in an ownership transfer service workflow.

In one aspect, a write operation may be performed by an application programming interface (API) of the virtual computing environment, which may constrain a set of authenticated customers authorized to write objects to the virtual computing bucket 930 and require that write operations be cryptographically signed with a secret access key of the virtual computing bucket 930 via policy in a security and authentication system. The virtual computing bucket 930 may not be owned by the same account, which knows the customer, such as customer 915a, who is the submitter. The virtual computing bucket 930a may be a shared write-only cross-account, such that a policy associated with the virtual computing bucket 930a, and the virtual computing bucket's 930a contents, are both invisible and immutable to the customer 915a (submitter) and all other customers in the submitter's account.

In another embodiment, objects 920 may be written anonymously to the virtual computing buckets 930 (e.g., 930a-930n) via web post requests, mediated by the virtual computing bucket 930 policy applied to the virtual computing bucket 930 which may constrain source internet protocol addresses from which objects may be written. In action 902, the event of the object 920 that is being written, may be retrieved and processed by an event driven function 940a, which has read privilege on virtual computing bucket 930a. The event driven function 940a may be an event-driven compute framework, which may have event triggers that run customer-defined functions (e.g., functions currently in Java or node.js) when an event occurs. The event driven function 940a may have a trigger for a write event to one of the virtual computing buckets 930, and may be triggered by action 901 to run a function, which may perform actions 902, 904, 906, 907 and 908.

Action 904 may be an optional step that may be performed, by which the event driven function 940a may invoke optional action 905 to enhance the evidential weight ascribable to the object 920 and the event of its placement in virtual computing bucket 930a. The event driven function 940a may write a copy of object 920 to a directory on computing instance 960, to which the event driven function 940a has write permissions.

In action 905, which may also be an optional step triggered by optional Action 904, computing instance 960 takes its copy of object 920 and pushes it over a trusted network link to virtual computing hardware security module (HSM) appliance 980, which wraps the copy of object 920 in a cryptographically-strong timestamp signed with a nominated pre-stored key in the HSM 980 and returns the wrapped copy of object 920 to computing instance 960. In one aspect, the virtual computing HSM 980 may establish a bidirectional cryptographic trust with computing instance 960 or other operating system (OS) instance and uses the bidirectional cryptographic trust, along with proprietary trusted network link software, to establish a virtual private network (VPN) between computing instance 960 and HSM 980. Secure timestamping and signing operations on data by the HSM 980 may be invoked using cryptography, public-key cryptography standards (PKCS) such as, for example, PKCS#11, Java Cryptography Extension (JCE) or Cryptographic Application Programming Interface (CAPI) API calls to the HSM 980 over the VPN. In one aspect, each of the timestamping and signing operations on data may not change the core content of object 920, but rather, the timestamping and signing operations prepend or append cryptographic data in a wrapping process that ensures that the composite wrapped object 920 may not be subsequently modified in terms of changing its core content or timestamp in an unauthorized manner, without further cryptographic operations incurring computational costs.

In action 906, the object 920 may be cached for a time determined by the workflow 900 maintainer(s). In one aspect, this may be done by invoking an asset control point 995, which may be a virtual computing services available for processing and moving data between different virtual computing and storage services. The asset control point 995 may be automated workflows not involving approval mechanisms, which, for example, may proceed from start to finish and can create, use and delete other virtual computing resources such as computing instances. The event driven function 940a may have a maximum lifetime of sixty (60) seconds. As such, additional mechanisms may be used to hold the object 920 in place in the workflow 900 for longer than 60 seconds, and asset control points, such as asset control point 995, may remain active and available as long as is necessary to complete one or more workflows. In one aspect, the additional mechanisms that may be used to hold the object 920 in place in the workflow 900, may include an asset control point 995 that could launch a computing instance with permissions and instructions to make a local copy of the object 920, and set an "at job" to perform action 910 at a specified time and/or after a specified time period has elapsed.

To provide a suitable "wait" function, an asset control point 995 may be invoked to launch a computing instance which would look in virtual computing bucket 930a for the object 920, and as an "at" job and copies the object 920 to virtual computing bucket 930a as action 910 and then terminate. At this point, the workflow 900 may end. It should be note that the "at" is a utility that may read commands from an input and group them together as an "at-job", to be executed at a later time.

In action 907, which is an optional step, a record of object 920's appearance in virtual computing bucket 930a is written by an event driven function 940a to a row in a table in a data warehouse such as data warehouse 950. Such a record would typically include a timestamp, the submitter's customer name, and a cryptographic digest of object 920. While this step is not strictly required for the function of the workflow, it is expected that a large number of objects will pass through the workflow during its lifetime, having a long-term, readily-searchable index of objects is likely to be of benefit to the workflow's owners, submitters and approvers.

In action 908, which is an optional step, a record of object 920 as written to virtual computing buckets 930b (so, object 920 as written to virtual computing bucket 930a unless the optional steps 904 and 905 were included, in which case the object is as cryptographically wrapped by virtual computing hardware security module 980 is written to an external service by the event driven function 940a via the internet. It is appreciated that some workflow customers may want to have a record, which is independent of the virtual computing service environment of objects passing through the workflow, and this is the appropriate point at which to insert it.

Action 909 may also be an optional step accompanying action 908, depicting an internet-based 975 records service 990 and a record being written to the Internet-based records service 990. In order to preserve the confidentiality of the data in the object 920, a cryptographic digest of the object 920 may be written, rather than the object 920. In one aspect, Internet-based records service 990 provides a web interface to a bitcoin like blockchain, where the blockchain may be a highly-distributed, highly-resilient mechanism of a record for bitcoin transactions. Also, the Internet-based records service 990 may also being used for other purposes, such as a distributed, anonymous system of record (e.g., a notary service).

Figure 10:
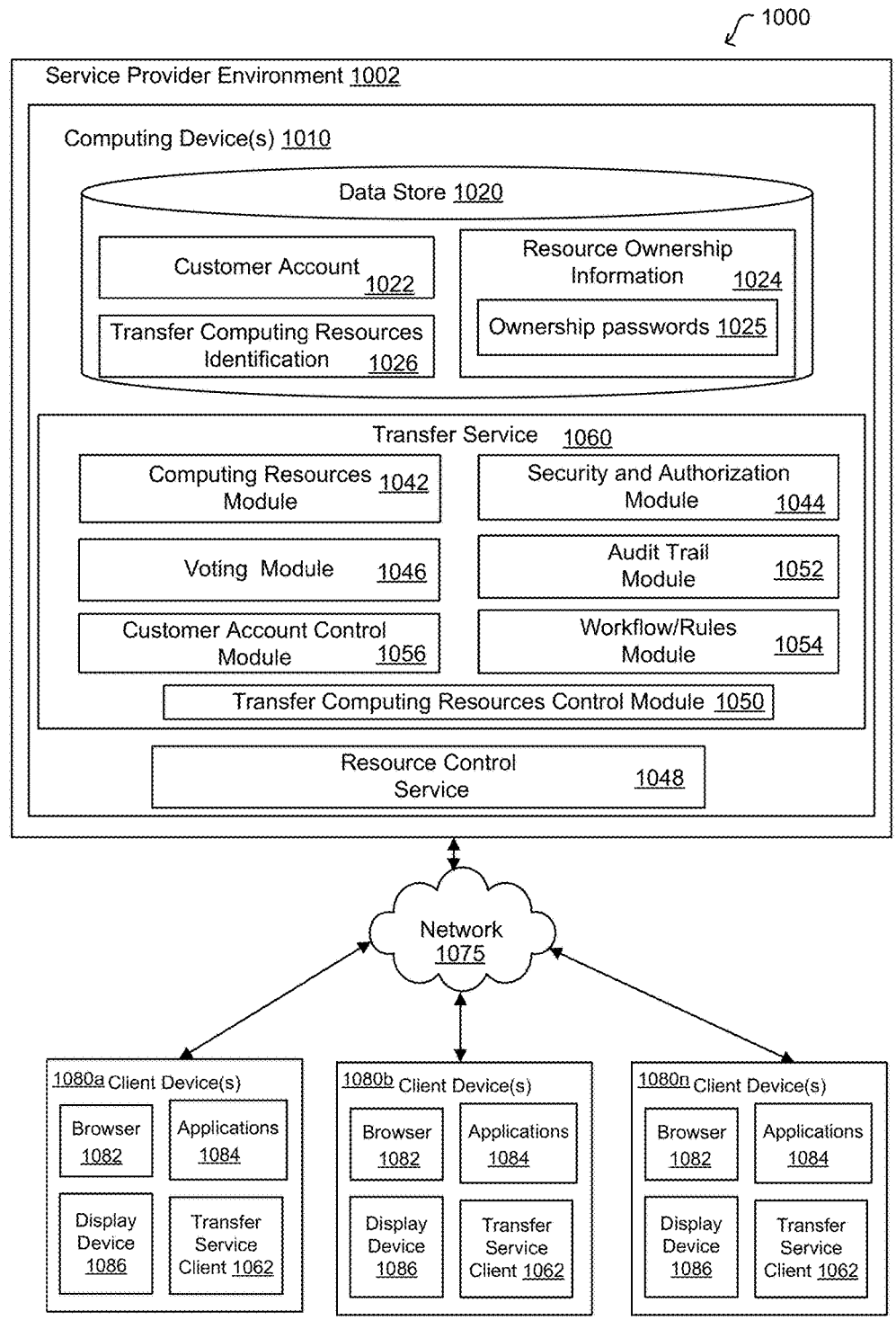
FIG. 10 illustrates a system for providing an ownership account transfer service for controlling and transferring computing resources in a service provider environment according to an example of the present technology.

FIG. 10 illustrates a system 1000 for providing an ownership transfer service for transferring computing resources in a service provider environment. In the following discussion, a general description of an example centralized system for secure transfer of a virtualized computing resource between at least two entities in a computing environment is provided. The general description is followed by a discussion of the operation of the components in a system for the technology.

FIG. 10 illustrates a system 1000 having a networked computing environment according to one example of the present technology. The system 1000 may include a service provider environment 1002 that may include one or more computing devices 1010. The system 1000 may include one or more computing devices 1010 in data communication with a client device 1080*a*-*n* (illustrated in FIG. 10 as one or more client devices, such as client devices 1080*a*, 1080*b*, and 1080*n*) by way of a network 1075. The network 1075 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 1010 according to varying configurations. Also, various data may be stored in a data store 1020 that is accessible to the computing device 1010. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store 1020 may include storage systems such as a SAN (Storage Area Network), cloud storage network, volatile or non-volatile RAM, optical media, or hard-drive type media. The data stored in the data store 1020, for example, may be associated with the operation of the various applications and/or functional entities described below.

The data stored in the data store 1020 may include available customer information and identification data included within one or more customer accounts 1022. The customer accounts 1022 may also be associated with resource ownership information 1024 or have electronic links to ownership passwords 1025 (e.g., records or files of ownership passwords) added from the resource ownership information 1024 associated with one or more customer accounts 1022, and the customer accounts 1022 may be managed by the resource control service 1048.

The customer accounts 1022 may be associated with the transfer computing resources identification 1026 of a customer for accessing the computing device 1010 and authenticating the client devices 1080*a*-*n*. The customer accounts 1022 may be limited to customer accounts 1022 that have various resources where exclusive control over the various resources are transferred, which are listed in the transfer computing resources identification 1026.

The resource ownership information 1024 may identify ownership of transferred computing resources. More specifically, the resource ownership information 1024 may link to the customer accounts 1022 or store a list of the customer accounts 1022 having exclusive control over computing resources of the service provider environment 1002. The resource ownership information 1024 may be accessed for adding, deleting, transferring, moving, copying, and/or recording ownership passwords (e.g., ownership passwords 1025) and for assisting with transferring exclusive control over computing resources of the service provider environment 1002 using the transfer service 1060. The resource ownership information 1024 may contain the ownership password 1025 information for enabling a virtual computing resource to be added to the customer account 1022 and/or accessing the computing resources. The ownership passwords 1025 may be selected from the resource ownership information 1024, such as, for example, by using a search query, and/or a lookup operation.

The components executed within the transfer service 1060 may include a computing resources module 1042, a security and authentication module 1044, a voting module 1042, a transfer computing resources control module 1050, an audit trail module 1052, a customer account control module 1056, and other service functions or applications, services, processes, systems, engines, or functionality not discussed in detail herein.

The computing resources module 1042, the security and authentication module 1044, the voting module 1044, the customer account control module 1056, the transfer computing resources control module 1050, the audit trail module 1052, and the customer account control module 1056 may each be located within the transfer service 1060. Alternatively, the computing resources module 1042, the security and authentication module 1044, the voting module 1044, the customer account control module 1056, the transfer computing resources control module 1050, the audit trail module 1052, and the customer account control module 1056 may each be separate from, but associated with, the transfer service 1060. Also, the customer account control module 1056 may be separate from, but associated with, the transfer service 1060.

The transfer service 1060 may create a transfer account and the transfer account may be configured to enable a transfer of exclusive control over the virtual computing resources between one or more customers within a service provider network hosted within a service provider environment.

The transfer service 1060 may identify, using the security and authentication module 1044, virtual computing resources, which may be under the control of the computing resources module 1042. These computing resources may be stored and identified in preparation for transferring the exclusive control over the computing resources between customers, such as from one or more controlling customers (e.g., customer that control the computing resources) to non-controlling customers or receiving customers using the resources control service 1048.

The workflows/rules module 1054 may establish and define workflows having a pre-defined set of triggers for releasing the computing resources from an ownership transfer account of one or more of the customers 1022 that are identified as "controlling customers" by the customer account control module 1056. The exclusive control over the computing resources managed by the computing resources module 1042 may be transferred and/or terminated using the transfer computing resources control module 1050 and the exclusive computing resources control service 1048 from the one or more controlling customers identified in the customer account 1022 and the customer account control module 1056 to an alternative non-controlling or receiving customer(s) (e.g., non-customers) of the customer account 1022 upon occurrence of at least one of the pre-defined set of triggers that may be identified and detected by the workflows/rules module 1054. In one aspect, the pre-defined set of triggers may be a vote amongst the one or more customers having control over the computing resources, an expiration of a predetermined period of time, and/or events outlined or defined within a third party ownership transfer account agreement. For example, access to the computing resources may be terminated upon expiration of the predetermined time period.

Exclusive control over computing resources may be controlled by the computing resources module 1042 and the exclusive control may be transferred according to a vote executed by the voting module 1042. The transfer account may operate like another customer account 1022 but the transfer account may be controlled by the service provider environment. Further, the transfer account may have its own set of permission as defined by the service provider environment. The data store 1020 may be in communication with both the transfer service 1060 and the customer account control module 1056 to assist with data used for the functions of the transfer service 1060. In one aspect, the transfer computing resources identification 1026 may be used by the transfer service 1060, which may also have access to the customer account module 1046. The transfer voting module 1042 may be provided in association with the transfer service 1060 for creating a transfer account to facilitate a transfer of exclusive control over the virtual computing resources between one or more customers within a service provider network hosted within a service provider environment 1002.

In one aspect, the voting module 1046 may be used to trigger the transfer upon one or more controlling and transferring parties executing a vote amongst the controlling customers for granting approval and triggering the transfer of the exclusive control over the computing resources. The transfer service 1060 may notify one or more customers associated with the transfer computing resources identification 1026 for requesting a quorum vote and/or requesting permission to transfer the exclusive control over the computing resources (e.g., virtual computing resources) from at least one controlling customer account of the customer accounts 1022 at least one non-controlling customer account of the customer account 1022.

In one aspect, the transfer service 1060 may be associated with a customer account control module 1056. The customer account control module 1056 may include an ownership table and a dependency graph or dependency list. The customer account control module 1056 may be configured to receive updated information relating to virtual computing resource transfers. For example, the customer account control module 1056 may include policies, rules, and/or attributes relating to the virtual computing resource. These policies, rules, and/or attributes relating to the virtual computing resource may be updated, altered, removed, and/or added for either preventing and/or allowing the transfer of virtual computing resource. In addition, the customer account control module 1056 may include the functionality to transfer ownership of transfer ownership records of the virtual computing resources that have been tagged from the target customer account to the transfer account and may include the functionality of recording the transferring of ownership of transfer records.

In one aspect, the audit trail module 1052 may maintain and provide an audit trail relating to the transfer of the exclusive control of the virtual computing resources. In addition, the transfer service 1060 and audit trail module 1052 may be configured for delivering notifications and audit updates each time the exclusive control over the computing resources are transferred, terminated, monitored, voted on for transfer, and/or other actions, such as those actions described in FIGS. 6-9. It should also be noted that each action and/or operation described in FIGS. 1-9 and 11-14 may also use each of the modules and/or services described in FIG. 10.

Certain processing modules may be discussed in connection with this technology and FIG. 10. In one example configuration, a module of FIG. 10 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 1010 may comprise, for example, a server computer or any other system providing computing capability. Alternatively, a plurality of computing devices 1010 may be employed that are arranged, for example, in one or more server banks, computer banks or other computing arrangements. For example, a plurality of computing devices 1010 together may comprise a clustered computing resource, virtualization server, a grid computing resource, and/or any other distributed computing arrangement. Such computing devices 1010 and data stores 1020 may be located in a single installation or may be distributed among many different geographical locations. For purposes of convenience, the computing device 1010 is referred to herein in the singular. Even though the computing device 1010 is referred to in the singular, it is understood that a plurality of computing devices 1010 may be employed in the various arrangements as described above.

The client device 1080 may be representative of a target device, social media sites, and/or content sites that may be coupled to the network 1075. The client device 1080 may comprise, for example, a processor-based system such as a computer system. Such a computer system may be embodied in the form of a desktop computer, a laptop computer, personal digital assistants, cellular telephones, smartphones, voice-controlled playback devices (e.g., smart speakers), set-top boxes, network-enabled televisions, tablet computer systems, or other devices with like capability. The client device 1080 may be configured to execute various applications such as a browser 1082, and/or other applications 1084. The applications 1084 may correspond to code that is executed in the browser 1082 (e.g., web applications). The applications 1084 may also correspond to standalone applications, such as networked applications. The applications 1084 may include and/or be associated with one or more transfer service client 1062 that are executed on the client device 1080 as directed by the transfer service 1060 for transfer, termination of the of the computing resources, and/or access, and/or control of the computing resources.

The client device 1080 may include or be coupled to a display device 1086. The browser 1082 may be executed on the client device 1080, for example, to access and render network pages (e.g. web pages) or other network content served up by the computing device 1010 and/or other servers. The display device 1086 may comprise, for example, one or more devices such as cathode ray tubes (CRTs), liquid crystal display (LCD) screens, gas plasma-based flat panel displays, LCD projectors, or other types of display devices, etc. In addition, the display device 1086 may include an audio device, tactile device (e.g., braille machine) or another output device to feedback to a customer.

In one configuration, the transfer service client 1062 may be an application functioning on the client device 1080 configured to assist with the secure virtual resources transfer as it relates to the client device 1080 and/or provide secure virtual resources transfer notification to the client device

1080. For example, the transfer service client 1062 may be an application installed on a smart phone. In the event that that transfer service 1060 transfers, for example, one or more virtual computing resources, the transfer service client 1062 may receive updates from the transfer service 1060 via the network 1075. The transfer service client 1062 may then provide, for example, and audio and/or a visual alert to the client device 1080. The transfer service client 1062 may publish or display the alert notification in a content site, a display ticker, a pop-up window, and/or short message service (SMS) message (e.g., a text message) or other message of limited length, such as a tweet, on the client device 1080.

Figure 11:
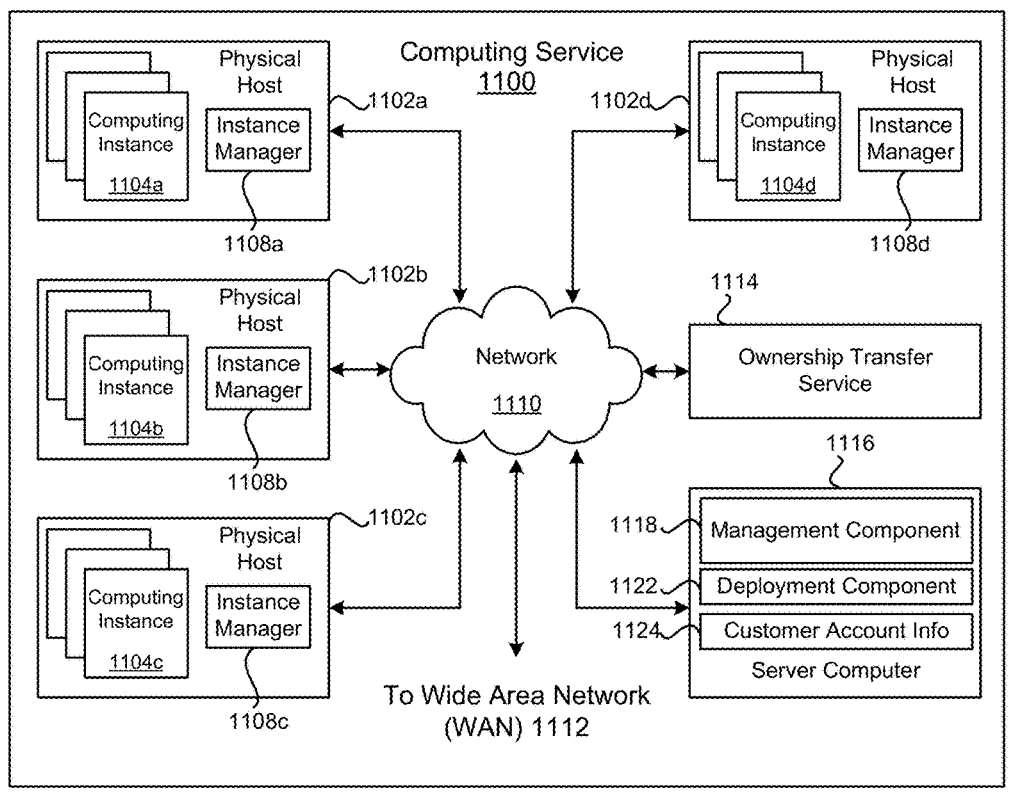
FIG. 11 is a block diagram that illustrates an example computing service environment that includes a transfer computing resources service.

FIG. 11 is a block diagram illustrating an example computing service 1100 that may be used to execute software services in association with a computing resource exclusive control service for secure transfer of exclusive control over virtual computing resources. In particular, the computing service 1100 depicted illustrates one environment in which the technology described herein may be used. The computing service 1100 may be one type of environment that includes various virtualized service resources that may be used, for instance, to host computing instances 1104a-d on which a trial computing service may execute.

The computing service 1100 may be capable of delivery of computing, storage and networking capacity as a software service to a community of end recipients. In one example, the computing service 1100 may be established for an organization by or on behalf of the organization. That is, the computing service 1100 may offer a "private cloud environment." In another example, the computing service 1100 may support a multi-tenant environment, wherein a plurality of customers may operate independently (i.e., a public cloud environment). Generally speaking, the computing service 1100 may provide the following models: Infrastructure as a Service ("IaaS"), Platform as a Service ("PaaS"), and/or Software as a Service ("SaaS"). Other models may be provided. For the IaaS model, the computing service 1100 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1100. End customers may access the computing service 1100 using networked client devices, such as desktop computers, laptops, tablets, smartphones, etc. running web browsers or other lightweight client applications, for example. Illustratively, the computing service 1100 may be described as a "cloud" environment. The particularly illustrated computing service 1100 may include a plurality of server computers 1102a-d. While four server computers are shown, any number may be used, and large data centers may include thousands of server computers. The computing service 1100 may provide computing resources for executing computing instances 1104a-d. Computing instances 1104a-d may, for example, be virtual machines. A virtual machine may be an instance of a software implementation of a machine (i.e., a computer) that executes applications like a physical machine. In the example of a virtual machine, each of the server computers 1102a-d may be configured to execute an instance manager 1108a-d capable of executing the instances. The instance manager 1108a-d may be a hypervisor, virtual machine monitor (VMM), or another type of program configured to enable the execution of multiple computing instances 1104a-d on a single server. Additionally, each of the computing instances 1104a-d may be configured to execute one or more applications.

Some of the servers may be used for executing the transfer computing resources service. For example, a server computer 1114 may execute a ownership transfer service for secure, transfer of exclusive control over virtual computing resources.

One or more server computers 1116 may be reserved to execute software components for managing the operation of the computing service 1100 and the computing instances 1104a-d. A server computer 1116 may execute a management component 1118. A customer may access the management component 1118 to configure various aspects of the operation of the computing instances 1104a-d purchased by a customer. For example, the customer may setup computing instances 1104a-d and make changes to the configuration of the computing instances 1104a-d.

A deployment component 1122 may be used to assist customers in the deployment of computing instances 1104a-d. The deployment component 1122 may have access to account information associated with the computing instances 1104a-d, such as the name of an owner of the account, credit card information, country of the owner, etc. The deployment component 1122 may receive a configuration from a customer that includes data describing how computing instances 1104a-d may be configured. For example, the configuration may include an operating system, provide one or more applications to be installed in computing instances 1104a-d, provide scripts and/or other types of code to be executed for configuring computing instances 1104a-d, provide cache logic specifying how an application cache may be prepared, and other types of information. The deployment component 1122 may utilize the customer-provided configuration and cache logic to configure, initialize, and launch computing instances 1104a-d. The configuration, cache logic, and other information may be specified by a customer accessing the management component 1118 or by providing this information directly to the deployment component 1122.

Customer account information 1124 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1124 may also include security information used in encryption of asynchronous responses to API requests. By "asynchronous" it is meant that the API response may be made at any time after the initial request and with a different network connection.

A network 1110 may be utilized to interconnect the computing service 1100 and the server computers 1102a-d, 1116. The network 1110 may be a local area network (LAN) and may be connected to a Wide Area Network (WAN) 1112 or the Internet, so that end customers may access the computing service 1100. The network topology illustrated in FIG. 11 has been simplified; many more networks and networking devices may be utilized to interconnect the various computing systems disclosed herein.

Figure 12:
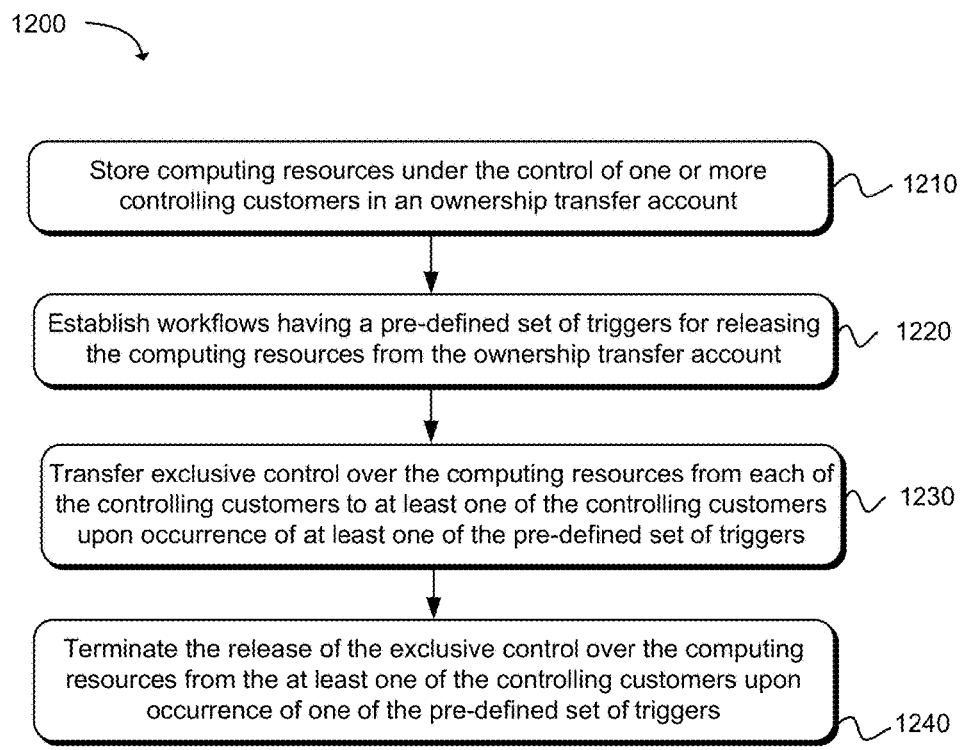
FIG. 12 is a flowchart of an example method for providing an ownership account transfer service for controlling and transferring computing resources within a computing service environment according to an example of the present technology.

Moving now to FIG. 12, a flow diagram illustrates an example method 1200 for a providing an ownership account transfer service for controlling and transferring computing resources within a computing service environment. The functionality may be implemented as a method and executed as instructions on a machine, where the instructions are included on at least one computer readable medium or one non-transitory machine-readable storage medium. For example, starting in block 1210, computing resources, which may be virtual computing resources, may be stored under the control of a multiplicity of controlling customers (e.g., "controlling customers") in an ownership transfer account. The virtual computing resources may include one or more of: computing instances, computing service images, networking resources, storage resources, and/or a combination thereof.

Multiple workflows having a pre-defined set of triggers, for releasing the computing resources from the ownership transfer account (e.g., released from the controlling parties) may be established, as in block 1220. As in block 1230, exclusive control may be transferred over the computing resources from each of the controlling customers to at least one of the controlling customers upon occurrence of at least one of the pre-defined set of triggers. The exclusive control over the computing resources may be terminated from the at least one of the controlling customers upon occurrence of one of the pre-defined set of triggers, as in block 1240.

Figure 13:
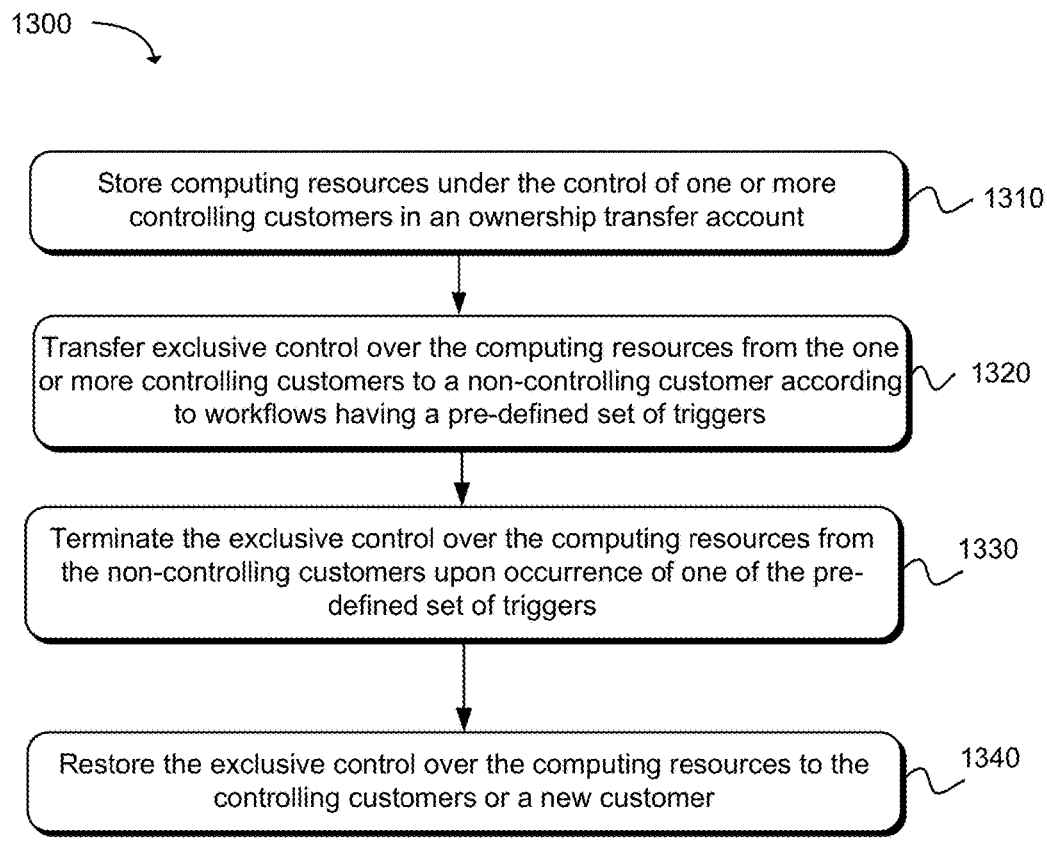
FIG. 13 is a flowchart of an additional example method for providing an ownership account transfer service for controlling and transferring computing resources within a computing service environment according to an example of the present technology.

Turning now to FIG. 13, a flow diagram illustrates an example method 1300 providing an ownership account transfer service for controlling and transferring computing resources within a computing service environment. The functionality may be implemented as a method executed as instructions on a machine, where the instructions are included on at least one computer readable medium or one non-transitory machine-readable storage medium. For example, starting in block 1310, computing resources, which may be virtual computing resources, may be stored under the control of multiple customers in an ownership transfer account. The virtual computing resources may include one or more of: computing instances, computing service images, networking resources, storage resources, and/or a combination thereof.

As in block 1320, exclusive control may be transferred over the computing resources from each of the multiple controlling customers to at least one of the multiple controlling customers (e.g., control is transferred from multiple controlling customers to a single controlling customer) upon occurrence of at least one of the pre-defined set of triggers. The exclusive control over the computing resources may be terminated from the at least one of the multiple controlling customers upon occurrence of one of the pre-defined set of triggers, as in block 1330. Moving to block 1340, the exclusive control over the computing resources may be restored to the one or more of the controlling customers and/or an new customer elected via a voting operation, via a $3^{rd}$ party ownership transfer account broker and/or a triggering event. For example, the exclusive control may be restored to one or more of the controlling customers that previous controlled over the computing resources. Alternatively, the exclusive control may be restored to a $3^{rd}$ party ownership transfer account broker. In one aspect, a quorum vote may elect a new customer for having exclusive control over the computing resources following the exclusive control over the computing resources terminating following a predetermined time periods. For example, a quorum vote may vote to provide the exclusive access to a first customer for a predetermined time period, such as 2 minutes (min). Upon expiration of the 2 minute time period, the exclusive control may transfer to a second customer for an alternative predetermined time period.

Figure 14:
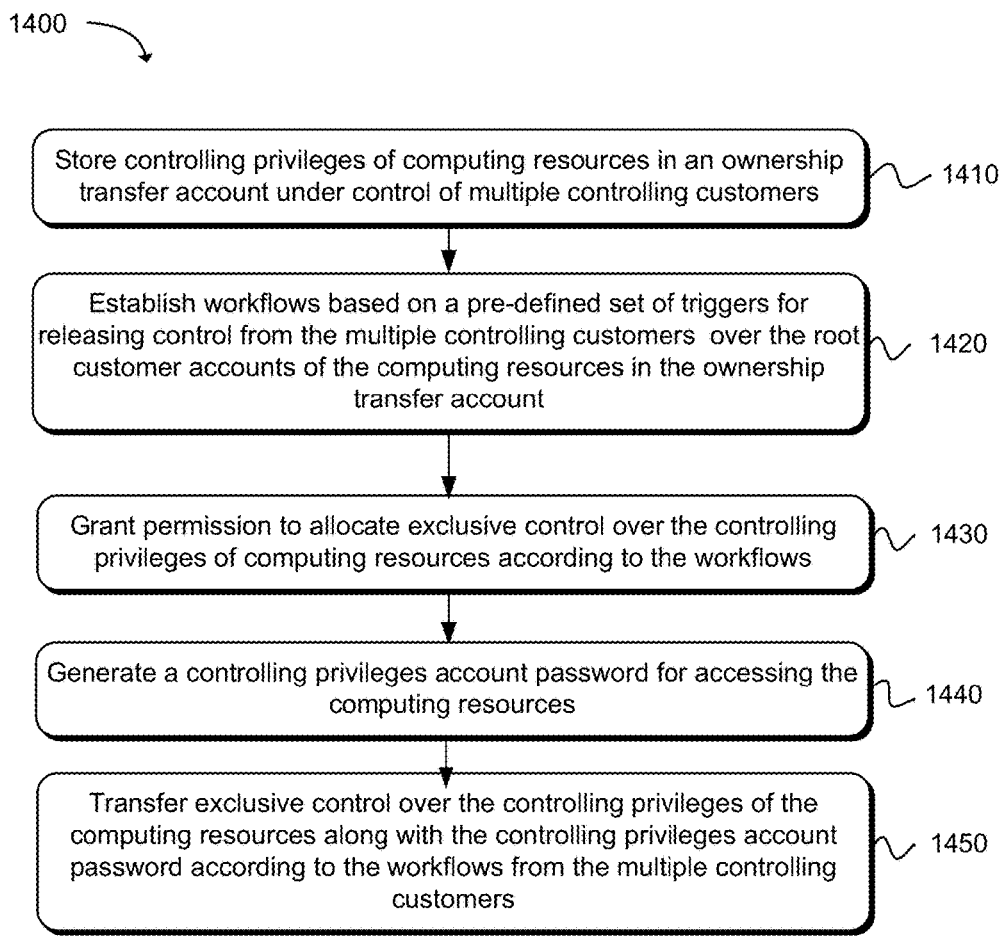
FIG. 14 is a flowchart of an additional example method for providing an ownership account transfer service for controlling and transferring computing resources within a computing service environment according to an example of the present technology.

Turning now to FIG. 14, a flow diagram illustrates an example method 1400 providing an ownership account transfer service for controlling and transferring computing resources. The functionality may be implemented as a method executed as instructions on a machine, where the instructions are included on at least one computer readable medium or one non-transitory machine-readable storage medium. For example, starting in block 1410, controlling privileges accounts of computing resources, which may be virtual computing resources, may be stored under the control of multiple customers in an ownership transfer account. The virtual computing resources may include one or more of: computing instances, computing service images, networking resources, storage resources, and/or a combination thereof.

As in block 1420, multiple workflows based on a pre-defined set of triggers for releasing control over the controlling privileges accounts of computing resources from the ownership transfer account may be established. As in block 1430, permissions to allocate exclusive control over the controlling privileges accounts of computing resources according to the multiple workflows may be granted. Moving to block 1440, a controlling privileges account password for accessing the computing resources may be generated. As in block 1450, exclusive control may be transferred over the controlling privileges accounts of the computing resources along with the controlling privileges account password according to the workflows. For example, the exclusive control and the controlling privileges account password may be transferred over the controlling privileges accounts of the computing resources from multiple customers to at least one of the multiple customers and/or one or more new customers upon occurrence of a quorum vote.

Figure 15:
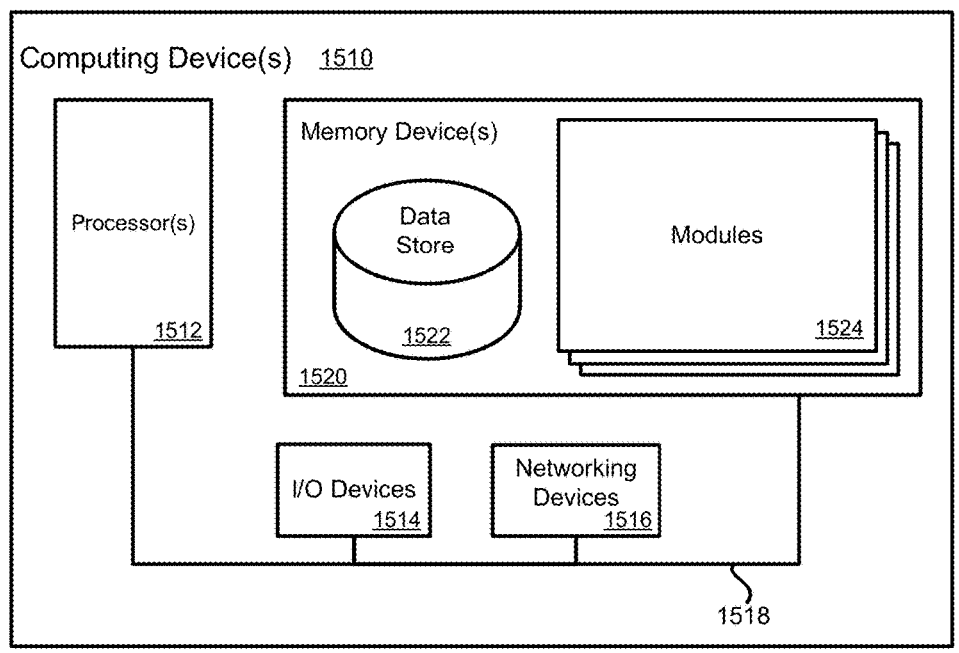
FIG. 15 is a block diagram that provides an example illustration of a computing device that may be employed in the present technology.

FIG. 15 illustrates a computing device 1510 on which modules of this technology may execute. A computing device 1510 is illustrated on which a high level example of the technology may be executed. The computing device 1510 may include one or more processors 1512 that are in communication with memory devices 1520. The computing device may include a local communication interface 1518 for the components in the computing device. For example, the local communication interface may be a local data bus and/or any related address or control busses as may be desired.

The memory device 1520 may contain modules 1524 that are executable by the processor(s) 1512 and data for the modules 1524. The modules 1524 may execute the functions described earlier. A data store 1522 may also be located in the memory device 1520 for storing data related to the modules 1524 and other applications along with an operating system that is executable by the processor(s) 1512.

Other applications may also be stored in the memory device 1520 and may be executable by the processor(s) 1512. Components or modules discussed in this description that may be implemented in the form of software using high programming level languages that are compiled, interpreted or executed using a hybrid of the methods. The computing device may also have access to I/O (input/output) devices 1514 that are usable by the computing devices. An example of an I/O device is a display screen that is available to display output from the computing devices. Other known I/O device may be used with the computing device as desired. Networking devices 1516 and similar communication devices may be included in the computing device. The networking devices 1516 may be wired or wireless networking devices that connect to the Internet, a LAN, WAN, or other computing network.

The components or modules that are shown as being stored in the memory device 1520 may be executed by the processor 1512. The term "executable" may mean a program file that is in a form that may be executed by a processor 1512. For example, a program in a higher level language may be compiled into machine code in a format that may be loaded into a random access portion of the memory device 1520 and executed by the processor 1512, or source code may be loaded by another executable program and interpreted to generate instructions in a random access portion of the memory to be executed by a processor. The executable program may be stored in any portion or component of the memory device 1520. For example, the memory device 1520 may be random access memory (RAM), read only memory (ROM), flash memory, a solid-state drive, memory card, a hard drive, optical disk, floppy disk, magnetic tape, or any other memory components. The processor 1512 may represent multiple processors and the memory 1520 may represent multiple memory units that operate in parallel to the processing circuits. This may provide parallel processing channels for the processes and data in the system. The local interface 1518 may be used as a network to facilitate communication between any of the multiple processors and multiple memories. The local interface 1518 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions. The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The devices described herein may also contain communication connections or networking apparatus and networking connections that allow the devices to communicate with other devices.

Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media. Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for providing an ownership transfer service in virtual computing service environment, the method comprises:

under control of at least one processor and memory configured with executable instructions that:

store computing resources under the control of a plurality of customers in an ownership transfer account, using the least one processor and memory;

identify a plurality of workflows having a pre-defined set of triggers for releasing the computing resources from the ownership transfer account, using the at least one processor and memory;

transfer exclusive control over the computing resources from the plurality of customers to at least one of the plurality of customers upon occurrence of at least one of the pre-defined set of triggers, using the at least one processor and memory; and terminate the exclusive control over the computing resources for the at least one of the plurality of customers upon occurrence of one of the pre-defined set of triggers, using the at least one processor and memory.

2. The method of claim 1, wherein the executable instructions further:

store controlling privileges of the computing resources in the ownership transfer account, using the least one processor and memory, wherein the pre-defined set of triggers include at least one of a vote by a plurality of customers, an expiration of a predetermined time, a financial event, a loading of a document, or an event defined within an ownership transfer account agreement; and grant permission to allocate the exclusive control over the controlling privileges of computing resources by a quorum vote of the plurality of customers according to the plurality of workflows.

3. The method of claim 2, wherein executable instructions further including in the plurality of workflows at least one ownership transfer account service for transferring exclusive control over the computing resources from the plurality of customers to at least one of the plurality of customers, wherein the least one ownership transfer account service in the plurality of workflows triggers an alternative ownership transfer account service for transferring exclusive control over the computing resources from the plurality of customers to at least one of the plurality of customers.

4. A computer-implemented method, comprising:

under control of at least one processor and memory configured with executable instructions that:

store computing resources under the control of a plurality of customers in an ownership transfer account, using the least one processor and memory;

transfer exclusive control over the computing resources from the plurality of customers to a receiving customer according to a plurality of workflows having a pre-defined set of triggers, using the at least one processor and memory; and terminate the exclusive control over the computing resources from the receiving customer upon occurrence of one of the pre-defined set of triggers, using the at least one processor and memory.

5. The method of claim 4, wherein the executable instructions further:

store controlling privileges of the computing resources in the ownership transfer account, using the least one processor and memory, wherein the pre-defined set of triggers include at least one of a vote by the plurality of customers, an expiration of a predetermined time, a financial event, a loading of a document, or an event defined within an ownership transfer account agreement; and grant permission to allocate the exclusive control over the controlling privileges of computing resources by a quorum vote of the plurality of customers according to the plurality of workflows.

6. The method of claim 5, wherein executable instructions further including in the plurality of workflows at least one ownership transfer account service for transferring exclusive control over the computing resources from the plurality of customers to at least one of the plurality of customers, wherein the least one ownership transfer account service in the plurality of workflows triggers an alternative ownership transfer account service for transferring exclusive control over the computing resources from the plurality of customers to at least one of the plurality of customers.

7. The method of claim 5, wherein executable instructions further grant permission to allocate the exclusive control over the controlling privileges of computing resources by a quorum vote of the plurality of customers.

8. The method of claim 4, wherein the executable instructions further transfer exclusive control over the computing resources from the plurality of customers to the receiving customer according to a plurality of workflows.

9. The method of claim 4, wherein the executable instructions further:

transfer exclusive control over the computing resources from the plurality of customers to the receiving customer according to the a plurality of workflows, or return the exclusive control over the computing resources to the plurality of customers.

10. The method of claim 4, wherein the executable instructions further generate a controlling privileges account password for the computing resources to be transferred with the exclusive control.

11. The method of claim 4, wherein the executable instructions further maintain an audit trail of transfer of the computing resources.

12. The method of claim 4, wherein the executable instructions further implement a plurality of rules and limitations governing the exclusive control over the computing resources, wherein the plurality of rules and limitations may include at least one of:

executing a plurality of virtual computing environments in parallel by a customer for allowing the customer to inspect and verify the plurality of virtual computing environments are acceptable to the customer;

executing the computing resources in parallel by the customer for allowing the customer to inspect and verify each of the plurality of the computing resources are acceptable to the customer; and restricting access over the computing resources to read only access, providing temporary access over the computing resources, requiring control over the computing resources to return to the plurality of customers or a third party customer, or requiring a quorum vote of the plurality of customers for approval of granting the exclusive control over the computing resources.

13. The method of claim 4, wherein the executable instructions further terminate access to the computing resources from at least one of the plurality of customers upon expiration of a predetermined time period.

14. The method of claim 4, wherein the executable instructions further transfer exclusive control over the computing resources for read only access to the computing resources.

15. A method for providing an ownership transfer service in a computing service environment, the method comprises:

under control of at least one processor and memory configured with executable instructions that:

store controlling privileges of computing resources in an ownership transfer account under control of a plurality of customers, using the least one processor and memory;

identify a plurality of workflows responsive to a pre-defined set of triggers for transferring the controlling privileges of computing resources from the ownership transfer account, using the at least one processor and memory;

grant permission to allocate exclusive control over the controlling privileges of computing resources according to the plurality of workflows;

generate a controlling privileges account password for accessing the computing resources, using the at least one processor and memory; and transfer exclusive control over the controlling privileges of the computing resources along with the controlling privileges account password according to the plurality of workflows, using the at least one processor and memory.

16. The method of claim 15, further comprising executable instructions that terminate the exclusive control over the computing resources for either at least one of the plurality of customers or at least one receiving customer upon occurrence of one of the pre-defined set of triggers following a transfer of the exclusive control over the computing resources for either the at least one of the plurality of customers or the at least one receiving customer, using the at least one processor and memory.

17. The method of claim 16, further comprising executable instructions that terminate access to the computing resources upon expiration of a predetermined time period.

18. The method of claim 15, further comprising executable instructions that:

detect a triggering event for the workflows for transferring the exclusive control over the computing resources; and perform at least one of a plurality of stages included in the plurality of workflows to transfer the exclusive control over the computing resources, wherein the plurality of stages include at least one of a single approval stage, a quorum approval stage, an action stage, or a wait stage.

19. The method of claim 18, wherein the executable instructions further transfer exclusive control over the computing resources from the plurality of customers to at least one of the plurality of customers according to the plurality of workflows.

20. The method of claim 18, wherein the executable instructions further transfer exclusive control over the computing resources from the plurality of customers to at least one receiving customer according to the a plurality of workflows.

* * * * *